US012603860B2

(12) United States Patent
Kolati et al.

(10) Patent No.: US 12,603,860 B2
(45) Date of Patent: Apr. 14, 2026

(54) METHOD AND APPARATUS FOR MANAGING SYNCHRONIZATION SOURCE COLLISIONS IN MISSION CRITICAL SERVICES

(71) Applicant: Samsung Electronics Co., Ltd., Suwon-si (KR)

(72) Inventors: Naveen Kolati, Bangalore (IN); Siva Prasad Gundur, Bangalore (IN); Kiran Gurudev Kapale, Bangalore (IN); Prasenjit Chakraborty, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/612,159

(22) Filed: Mar. 21, 2024

(65) Prior Publication Data

US 2024/0340264 A1 Oct. 10, 2024

Related U.S. Application Data

(63) Continuation of application No. PCT/KR2024/003446, filed on Mar. 19, 2024.

(30) Foreign Application Priority Data

Mar. 29, 2023 (IN) .............................. 202341023288
Feb. 14, 2024 (IN) .............................. 2023 41023288

(51) Int. Cl.
*G06F 15/16* (2006.01)
*H04L 61/5046* (2022.01)
*H04L 65/75* (2022.01)

(52) U.S. Cl.
CPC .......... *H04L 61/5046* (2022.05); *H04L 65/75* (2022.05)

(58) Field of Classification Search
CPC ..... H04L 61/5046; H04L 67/75; H04L 65/65; H04L 65/1069; H04L 65/403
See application file for complete search history.

(56) References Cited

U.S. PATENT DOCUMENTS

| | | | |
|---|---|---|---|
| 7,764,971 | B2 | 7/2010 | Chu et al. |
| 9,306,991 | B2 | 4/2016 | Agulnik et al. |

(Continued)

FOREIGN PATENT DOCUMENTS

| | | | |
|---|---|---|---|
| IN | 201841007556 | A | 2/2018 |
| KR | 10-0748990 | B1 | 8/2007 |
| KR | 10-2008-0094417 | A | 10/2008 |

OTHER PUBLICATIONS

Motorola Solutions, Inc, Handling of the SSRC values for RTP and RTPC sessions, C1-160254, 3GPP TSG-CT WG1 Meeting #95bis, Jan. 6, 2016.

(Continued)

*Primary Examiner* — Duyen M Doan
(74) *Attorney, Agent, or Firm* — Jefferson IP Law, LLP

(57) ABSTRACT

A method of managing, by a server device, synchronization source (SSRC) collisions in mission critical services (MCX) is provided. The method includes receiving a request message for requesting to transmit one or more media streams to one or more receiver devices, from one or more sender devices during a session, determining a unique SSRC identifier for each media stream of the one or more media streams, and transmitting the unique SSRC identifier associated with each media stream of the one or more media streams to the one or more sender devices and the one or more receiver devices.

20 Claims, 11 Drawing Sheets

(56) References Cited

U.S. PATENT DOCUMENTS

| | | | | |
|---|---|---|---|---|
| 2002/0094081 | A1 | 7/2002 | Medvinsky | |
| 2008/0312923 | A1* | 12/2008 | Crinon | H04M 3/569 704/E15.001 |
| 2009/0161565 | A1 | 6/2009 | Reniere et al. | |
| 2011/0060992 | A1* | 3/2011 | Jevons | H04L 65/4015 715/719 |
| 2014/0089504 | A1* | 3/2014 | Scholz | H04L 43/062 709/224 |
| 2014/0111603 | A1* | 4/2014 | Khan | H04N 7/15 348/E7.083 |
| 2016/0094607 | A1* | 3/2016 | Bekiares | H04L 65/70 370/260 |
| 2017/0374109 | A1 | 12/2017 | Atarius et al. | |
| 2020/0287951 | A1* | 9/2020 | Kolati | H04L 65/60 |
| 2021/0044643 | A1* | 2/2021 | Bouvet | H04L 65/1069 |
| 2021/0360302 | A1 | 11/2021 | Kolati et al. | |
| 2022/0224746 | A1* | 7/2022 | Li | H04L 65/764 |

OTHER PUBLICATIONS

3rd Generation Partnership Project; Technical Specification Group Core Network and Terminals; Mission Critical Push To Talk (MCPTT) call control; Protocol specification (Release 18), 3GPP TS 24.379 V18.1.0 (Dec. 2022), Jan. 3, 2023.

International Search Report dated Jun. 24, 2024, issued in International Application No. PCT/KR2024/003446.

Kapale, Discussion on SSRC usage in floor control or transmission control and RTP media (audio and/or video media), 3GPP TSG-SA WG6 Meeting #140, C1-230669, Athens, Greece, Feb. 27-Mar. 3, 2023.

Extended European Search Report dated Jul. 22, 2025; European Appln. No. 24781098.9-1218.

* cited by examiner

METHOD AND APPARATUS FOR MANAGING SYNCHRONIZATION SOURCE COLLISIONS IN MISSION CRITICAL SERVICES

CROSS-REFERENCE TO RELATED APPLICATION(S)

This application is a continuation application, claiming priority under § 365 (c), of an International application No. PCT/KR2024/003446, filed on Mar. 19, 2024, which is based on and claims the benefit of an Indian Provisional patent application No. 202341023288, filed on Mar. 29, 2023, in the Indian Patent Office, and of an Indian Complete patent application Ser. No. 202341023288, filed on Feb. 14, 2024, in the Indian Patent Office, the disclosure of each of which is incorporated by reference herein in its entirety.

TECHNICAL FIELD

The disclosure relates to a field of wireless communication system. More particularly, the disclosure relates to a method and system of managing Synchronization Source (SSRC) collisions in Mission Critical Services (MCX).

BACKGROUND

A wireless communication network corresponds to a group of devices interacting with each other wirelessly. In the wireless communication network, at least one device from the group of devices may send or receive media stream to/from another device in the group. The media stream transmitted or received between the devices may be at least one of, audio data, video data, and the like. In existing techniques, one or more services or applications associated with real time communication are provided to facilitate interactions between the users. The one or more services may include a Mission Critical Services (MCX) which may include Mission Critical Video (also referred as MCVideo) which supports a communication of a video between several users. During the MCVideo communication, each user can gain permission to talk in an arbitrated manner. Further, in the MCVideo communication, a receiver identifies sender information based on a Synchronization Source (SSRC) identifier which is received in a Real-time Transport Protocol (RTP) packet. Thereafter, the SSRC identifiers (IDs) present in transmission control messages are mapped with the received RTP SSRC identifiers to associate the received stream with the user at the receiver's end.

In the existing techniques, during the wireless communication, each user randomly generates own SSRC identifier for transmitting the media stream. However, the random generation of the SSRC identifier by the user leads to a collision between the SSRC identifiers generated by various users.

FIG. 1 illustrates a scenario of SSRC collision at the receiver's end for a media stream transmitted from multiple users (sender devices) having same SSRC identifiers according to the related art.

Referring to FIG. 1, four users namely A, B, C, D are part of a group. A person skilled in art will understand that in a real-time case a group may have a plurality of users. The wireless communication is initiated by user A who tries to address fire situation at fire site 1. The user A captures a video from different angle/place. Similarly, users B who tries to address fire situation at fire site 2, captures a video from different angle/place. Consider the user C has responsibility to support only the fire site 1, then the user C accepts notifications received only from the user A. Thus, as a result, the user C receives only one audio and one video stream (from user A). Therefore, user C does not experience the SSRC collision. Whereas consider that user D has responsibility to support both the fire sites 1 and 2. The user D may accept notifications from both the users A and B. Therefore, as a result, user D may receive two audio streams and two video streams (from user A & B, both).

Referring to FIG. 1 that the SSRC identifiers associated with audio streams are different, user D may not face challenges while processing the audio streams. However, as video streams received from user A and user B are associated with same SSRC identifiers, which corresponds to "SSRC: BB", the user D fails to process the video streams. Thus, this results in displaying a black/corrupted image and this kind of video may cause a problem in life saving efforts. Therefore, SSRC collisions occur in MCX mainly because each client or user individually generates their own SSRCs which may be used in audio and video streams.

FIG. 2 illustrates a flow diagram for depicting the SSRC collision at the receiver's end. Before initiation of transmission or reception, an MCX session is established between multiple users (senders & receiver) and a server network (herein after server network is referred as server) according to the related art.

Referring to FIG. 2, a receiver device 105 (receiver C) may receive one or more media streams (video/audio) from multiple senders such as sender A 1031 and sender B 1032, through the server device 101 (server network). Particularly, the senders A and B are at fire sites where fire accidents have taken place due to which both the senders A and B wish to capture live audio and video and transmit it to the receiver C. The receiver C may be in a control room, whose job is to assist the senders A and B and also send more help/aid by understanding the situation (preferably by seeing & hearing live video content sent from the senders A & B).

At operation 201, the sender A sends a request to the server to grant him permission to send the media stream which may include a live audio and video stream.

At operations 202A and 202B, the server sends a grant message to the sender A and further sends a transmission notification to all other members in the group (i.e., receiver C in this example).

At operation 203, the receiver C sends a reception of an acceptance notification when the receiver C is interested to view the content which sender A wishes to send.

At operation 204, the sender A randomly generates an SSRC identifier for audio packet and sends all audio packets with SSRC: CC (here, the randomly generated audio SSRC is "CC").

At operation 205, the receiver C receives the audio stream with SSRC: CC.

At operation 206, the sender A randomly generates SSRC for video packet and sends all video packets with SSRC: DD (here, randomly generated video SSRC is "DD").

At operation 207, the receiver C receives the video stream with SSRC: DD.

From operations 205 and 207, it is observed that the receiver C has received a first set of media stream which comprises one stream of each media type (i.e., audio & video). Therefore, receiver C may process the audio and video packets and displays the media stream in User Interface (UI).

At operation 208, the sender B sends a request to the server to grant him permission to send the media stream which may include the live audio and video stream.

At operations 209A and 209B, the server sends a grant message to the sender B and further sends a transmission notification to all other members in the group (i.e., receiver C in this example).

At operation 210, the receiver C sends a reception of an acceptance notification when the receiver C is interested to view the content which sender B wishes to send.

At operation 211, the sender B randomly generates an SSRC identifier for audio packet and sends all audio packets with SSRC: EE (here, the randomly generated audio SSRC is "EE").

At operation 212, the receiver C receives the audio stream with SSRC: EE.

At operation 213, the sender B randomly generates SSRC for video packet and sends all video packets with SSRC: DD (here, randomly generated video SSRC is "DD").

At operation 214, the receiver C receives the video stream with SSRC: DD, again.

From operations 212 and 214, it is observed that the receiver C has received a second set of media stream which comprises one stream of each media type (i.e., audio & video). As the receiver C has already received the first set of media stream from the sender A, the receiver C now holds two sets of media streams (i.e., two audios and two videos). However, SSRC collision occurs while processing video packets received from the sender B as both the SSRC's associated with the video streams correspond to SSRC: DD (as clearly seen from operations 207 and 214). Therefore, as a result, the receiver C may either display a corrupted image or a black screen to the user.

Thus, SSRC collision leads to incorrect identification of the user and the associated media stream. The receiver may not distinguish which stream is from which user as the RTP streams received from two or more users have same SSRC identifiers. Further, incorrect handling of received streams such as decoding and rendering of the received streams may occur if the receiver or the server wrongly identifies the sender. This may further lead to failure in decrypting the media stream packets, as crypto keys are also dependent on the SSRC identifiers. Furthermore, users at receiver's end may either view the patchy/black image or hear noisy audio which may affect the life-saving efforts of first responders.

In the existing scenario, the SSRC collision was not a problem in MCX as the server was not supporting more than one active/simultaneous media transmission of user in a group. However, in future when MCX starts supporting more than one active/simultaneous media transmission of user per group, then the SSRC collision issue may occur between the senders and the receivers.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least advantages described below. Accordingly, an aspect of the disclosure is to provide a method and system of managing Synchronization Source (SSRC) collisions in Mission Critical Services (MCX).

Additional aspects will be set forth in part in the description which follows and, in part, will be apparent from the description, or may be learned by practice of the presented embodiments.

In accordance with an aspect of the disclosure, a method of managing, by a server device, synchronization source (SSRC) collisions in mission critical services (MCX) is provided. The method includes receiving a request message for requesting to transmit one or more media streams to one or more receiver devices, from one or more sender devices during a session, determining a unique SSRC identifier for each media stream of the one or more media streams, and transmitting the unique SSRC identifier for each media stream of the one or more media streams to the one or more sender devices and the one or more receiver devices.

In accordance with another aspect of the disclosure, a method of managing synchronization source (SSRC) collisions in mission critical services (MCX) is provided. The method includes sending, by a sender device, a request message to a server device during a session, wherein the request message includes a request to transmit one or more media streams to one or more receiver devices, receiving, by the sender device, an SSRC identifier in a grant message for each media stream of the one or more media streams from the server device, and transmitting, by the sender device, the one or more media streams comprising respective SSRC identifier to the server device in response to the grant message.

In accordance with another aspect of the disclosure, a method of managing synchronization source (SSRC) collisions in mission critical services (MCX) is provided. The method includes receiving, by a receiver device, an SSRC identifier in a notification message indicative of a request to receive one or more media streams from a server device, transmitting, by the receiver device, an acknowledgement for the request to receive the one or more media streams based on availability of resources to satisfy the request, and receiving, by the receiver device, the one or more media streams from the server device along with respective SSRC identifier.

In accordance with another aspect of the disclosure, a server device for managing synchronization source (SSRC) collisions in mission critical services (MCX) is provided. The server device includes one or more processors and memory communicatively coupled to the one or more processors, wherein the memory store one or more computer programs including computer-executable instructions that, when executed by the one or more processor, cause the server device to perform operations. The operations comprise receiving a request message for requesting to transmit one or more media streams to one or more receiver devices, from one or more sender devices during a session, determining a unique SSRC identifier for each media stream of the one or more media streams, and transmitting the SSRC identifier for each media stream of the one or more media streams to the one or more sender devices and the one or more receiver devices.

In accordance with another aspect of the disclosure, a sender device for managing synchronization source (SSRC) collisions in mission critical services (MCX) is provided. The sender device includes one or more processors and memory communicatively coupled to the one or more processors, wherein the memory store one or more computer programs including computer-executable instructions that, when executed by the one or more processors, cause the sender device to send a request message to a server device during a session, wherein the request message includes a request to transmit one or more media streams to one or more receiver devices, receive an SSRC identifier in a grant message for each media stream of the one or more media streams, from the server device, and transmit the one or more media streams comprising respective SSRC identifier to the server device, on receiving the grant message.

In accordance with another aspect of the disclosure, a receiver device for managing synchronization source (SSRC) collisions in mission critical services (MCX) is provided. The receiver device includes one or more processors and memory communicatively coupled to the one or more processor, wherein the memory store one or more computer programs including computer-executable instructions that, when executed by the one or more processors, cause the receiver device to receive an SSRC identifier in a notification message indicative of a request to receive one or more media streams, from a server device, transmit an acknowledgement for the request to receive the one or more media streams, based on an availability of resources to satisfy the request, and receive the one or more media streams from the server device, along with respective SSRC identifier.

In accordance with another aspect of the disclosure, one or more non-transitory computer-readable storage media storing one or more computer programs including computer-executable instructions that, when executed by one or more processors of a server device, cause the server device to perform operations for managing synchronization source (SSRC) collisions in mission critical services (MCX) are provided. The operations include receiving a request message for requesting to transmit one or more media streams to one or more receiver devices, from one or more sender devices during a session, determining a unique SSRC identifier for each media stream of the one or more media streams, and transmitting the unique SSRC identifier for each media stream of the one or more media streams to the one or more sender devices and the one or more receiver devices.

In accordance with another aspect of the disclosure, one or more non-transitory computer-readable storage media storing one or more computer programs including computer-executable instructions that, when executed by one or more processors of a sender device, cause the sender device to perform operations for managing synchronization source (SSRC) collisions in mission critical services (MCX) are provided. The operations include sending, by the sender device, a request message to a server device during a session, wherein the request message comprises a request to transmit one or more media streams to one or more receiver devices, receiving, by the sender device, an SSRC identifier in a grant message for each media stream of the one or more media streams from the server device, and transmitting, by the sender device, the one or more media streams comprising respective SSRC identifier to the server device in response to the grant message.

In accordance with another aspect of the disclosure, one or more non-transitory computer-readable storage media storing one or more computer programs including computer-executable instructions that, when executed by one or more processors of a receiver device, cause the receiver device to perform operations for managing synchronization source (SSRC) collisions in mission critical services (MCX) are provided. The operations include receiving, by the receiver device, an SSRC identifier in a notification message indicative of a request to receive one or more media streams, from a server device, transmitting, by the receiver device, an acknowledgement for the request to receive the one or more media streams based on availability of resources to satisfy the request, and receiving, by the receiver device, the one or more media streams from the server device along with respective SSRC identifier.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE ACCOMPANYING DIAGRAMS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
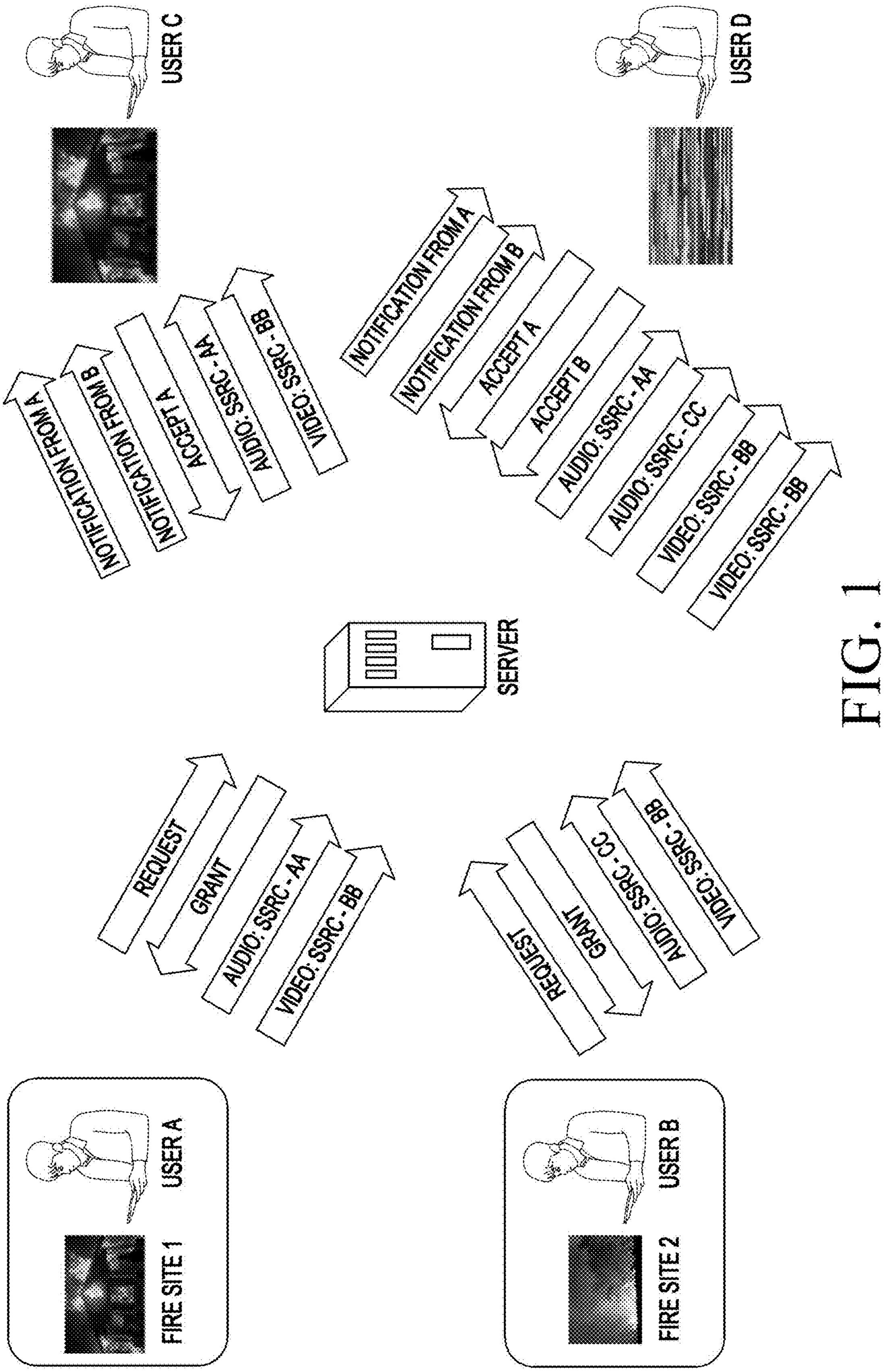
FIG. 1 illustrates an existing scenario of SSRC collision at receiver device according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprises," "comprising," "includes" or any other variations thereof, are intended to cover a non-exclusive inclusion, such that a setup, device, or method that includes a list of components or steps does not include only those components or steps but may include other components or steps not expressly listed or inherent to such setup or device or method.

In other words, one or more elements in a system or apparatus proceeded by "comprises . . . a" does not, without more constraints, preclude the existence of other elements or additional elements in the system or method.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Disclosed herein is a method and a system for managing Synchronization Source (SSRC) collisions in Mission Critical Services (MCX). In existing techniques, SSRC identifiers are randomly generated by sender devices for each streaming media. Therefore, this may lead to two or more sender devices generating same SSRC identifier, thereby causing SSRC collisions. Incorrect handling of received streams such as decoding and rendering of the received streams may occur if the receiver or the server wrongly identifies the sender. This may further lead to failure in decrypting the media stream packets, as crypto keys are also dependent on the SSRC identifiers. Furthermore, the SSRC collisions in MCX may result in displaying a black/corrupted image or video which may affect the life-saving efforts of first responders.

Therefore, to solve the above problems, the disclosure discloses a method for managing the SSRC collisions in MCX. The disclosure provides generation of a unique SSRC identifier by a server device, rather than a sender device. The generated SSRC identifier is transmitted to the sender device who wishes to share a media stream with one or more receiver devices. The sender device may transmit the media stream with the SSRC identifier generated by the server device for the corresponding media stream. The server device maintains a record of the SSRC identifiers generated for a session, due to which the SSRC collisions are avoided as generation of each SSRC identifier remains unique. As unique SSRC identifiers are generated for transmission of each media stream, crypto will be stronger and will be less prone to any kind of hacking.

Overview

The disclosure relates to a wireless communication system. More particularly, the disclosure relates to a method and a system for handling media streams in a wireless communication system.

A wireless communication network is a group of multiple devices interacting with each other wirelessly. In the wireless communication network, at least one of the devices may send or receive data to/from another device. The data transmitted or received between the devices may be at least one of, audio data, video data and the like. In existing arts, there are one or more services or application are provided for interaction between the users. One of the existing services may include a Mission Critical (MC) video (also referred as MCVideo) group call which supports a video communication between several users. In MC video group call, each user can gain access to the permission to talk in an arbitrated manner. Also, MCVideo service supports private calls between two users. Further, in MCVideo group call, a receiver identifies a sender information using Synchronization Source (SSRC) identification from the received Real-time Transport Protocol (RTP) packet. Thereafter, SSRCs present in floor/transmission/reception control messages are mapped with the received RTP SSRC to associate the received stream with the user. In existing techniques, during wireless communication, each user chooses his own SSRC randomly while transmitting media or data. The random generation of SSRC by the user leads to the collision of the SSRC values between users. For example, consider a scenario of SSRC collision at the receivers end for data transmitted from multiple users (transmitters) having same SSRC. Consider a User Equipment (UE) which may receive one or more data (video/audio) from the multiple senders such as user A, B, C through the server network.

The SSRC collision leads to several problems at the receiving side. Hence, to overcome the SSRC collision, there exists certain SSRC collision detection procedures mentioned in a RTP RFC. However, the existing procedures are suitable for handling only bi-directional streams, but not uni-directional streams as seen in MCX scenarios. Also, the MCX 3$^{rd}$ Generation Partnership Project (3GPP) specifications do not address the SSRC collision issues where there is a provision to accept/reject media receive request. Further, SSRC collision, may lead to incorrect identification of users, incorrect handling of received streams such as decoding and rendering of received streams occurs if the device or server wrongly identify the user. Thus, there is a need for an improved method and system for handling the SSRC collision and thus the resources in the wireless communication system.

In an implementation, the disclosure relates to a method and a system for handling resource in a wireless communication system. The system of the disclosure includes a server and the user equipment interacting with each other through a wireless communication network. Initially, the server receives a plurality of requests from a plurality of User Equipment's (UEs) in at least one of Mission Critical Push to Talk (MCPTT) session and MCVideo session. Further, the server generates a unique SSRC identifier for each request corresponding to each UE. Thereafter, the server sends at least one of a floor control message, a reception control message, and a transmission control message with the unique SSRC identifier to each UE. Furthermore, the server receives at least one of RTP packet and RTP control protocol (RTCP) packet associated with the unique SSRC identifier from a first UE among the plurality of UEs based on the at least one of the floor control message, the reception control message, and the transmission control message. Finally, the server forwards at least one of RTP packet and RTCP packet associated with the unique SSRC identifier to a second UE among the plurality of UEs.

In an embodiment, the server may generate a unique and different SSRC for each media type for a request from UE. Ex: if audio and video are the two media types allowed then server may generate unique SSRC for audio stream and unique SSRC for video stream for each request from UE.

The newly generated audio and video SSRC is communicated back to UE and UE may use these SSRC in audio and video stream RTP media packets until the transmission is released.

In yet another non-limiting embodiment, a first User Equipment (UE) initiates a request to get access to send media stream to server. Further, the first UE receives a grant message with unique SSRC for audio and video stream from server. Thereafter, the first UE stores audio and video SSRC of granted transmission participant received in the Transmission Granted message. Finally, the UE sends one of RTP packet and the RTCP packet with the stored SSRC to the server.

The disclosure relates to a method and a system for handling resource in a wireless communication system. In the disclosure, the server generates a unique SSRC identifier for each request corresponding to each User Equipment (UE). In an embodiment, the server may generate a unique and different SSRC for each media stream corresponding to a UE. Consider generating a unique and different SSRC for each media type associated with a User Equipment (UE), in accordance with an embodiment of the subject. Initially, consider a sender A may send a request to get access to send media stream to the server. Further, the server may generate a unique and different SSRC for each media type corresponding to sender A. For example, the server may generate an SSRC “CC” for audio stream and SSRC “DD” for video stream corresponding to the sender A. Upon generation, the server may transmit a media transmission notification message to a receiver C, where the transmission notification message includes the SSRC value generated by the server for the audio stream and the video stream. The message format for the transmission notification message transmitted by the server to the receiver C. The transmission notification message may include two separate fields for specifying audio SSRC of the transmitter and the video SSRC of the transmitter.

The audio SSRC of the transmitter field carries the SSRC value for Audio RTP stream of the user transmitting the media. The audio SSRC of the transmitter field is coded as described below:

1. Audio SSRC of the Transmitting Participantfield

The content of the Audio SSRC of Transmitting Participant field is coded as specified in IETF RFC 3550 [3]. An Audio SSRC of Transmitting Participantfield can also have a Field ID and a length value. This subclause specifies an Audio SSRC of Transmitting Participantfield including a Field ID and a length value.

Audio SSRC of Transmitting User field coding

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| SSRC          | SSRC          | SSRC                          |
| field ID      | length        |                               |
+-+-+-+-+-+-+-+-+-+-+-+-+-+-+-+-+-+-+-+-+-+-+-+-+-+-+-+-+-+-+-+-+
|             SSRC              | Spare                         |
|                                                               |
+-+-+-+-+-+-+-+-+-+-+-+-+-+-+-+-+-+-+-+-+-+-+-+-+-+-+-+-+-+-+-+-+
```

The <SSRC field ID> [i.e Audio SSRC of Transmitting Participant field] value is a binary value and set to 01110 [Decimal value 14]

The <SSRC length> [i.e Audio SSRC of Transmitting User length] value is a binary value and has the value ‘6’. indicating the total length in octets of the <Audio SSRC of Transmitting User length> value item and the spare bits The <SSRC> [i.e Audio SSRC of Transmitting Participant] value is coded as the SSRC specified in IETF RFC 3550 [3].

The spare bits are set to zero.

Similarly, the video SSRC of the Transmitting User field carries the SSRC value for Video RTP stream of the user transmitting the media. The video SSRC of the Transmitting User field is coded as described below 2. Video SSRC of the Transmitting User Field The content of the Video SSRC of Transmitting User field is coded as specified in IETF RFC 3550 [3]. An Video SSRC of Transmitting User field can also have a Field ID and a length value. This subclause specifies an Video SSRC of Transmitting User field including a Field ID and a length value.

Video SSRC of Transmitting User field coding

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| SSRC          | SSRC          | SSRC                          |
| field ID      | length        |                               |
+-+-+-+-+-+-+-+-+-+-+-+-+-+-+-+-+-+-+-+-+-+-+-+-+-+-+-+-+-+-+-+-+
|             SSRC              | Spare                         |
```

The <SSRC field ID> [i.e Video SSRC of Transmitting Participant field] value is a binary value and set to 11000 [Decimal value 24] or 10111 [Decimal value 23].

The <SSRC length> [i.e Video SSRC of Transmitting User length] value is a binary value and has the value ‘6’ indicating the total length in octets of the <Video SSRC of Transmitting User length> value item and the spare bits The <SSRC> [i.e Video SSRC of Granted Participant] value is coded as the SSSRC specified in IETF RFC 3550 [3].

The spare bits are set to zero.

Furthermore, the server may transmit a grant message to the sender A, where the grant message also includes the generated SSRC “CC” for the audio stream and the generated SSRC “DD” for video stream. The grant message includes two fields, where the two fields are “Audio SSRC of the Transmitting User” and “Video SSRC of the Transmitting User”. The audio SSRC of the Transmitting User field carries the SSRC value for Audio RTP stream of the user transmitting the media. The audio SSRC of the transmitter field is coded as described in section.1; the video SSRC of the Transmitting User field carries the SSRC value for Video RTP stream of the user transmitting the media. The video SSRC of the Transmitting User field is coded as described in section.2 In this case, the Audio SSRC field may have the value “CC” and the video SSRC filed may have the value “DD”. The content of the Audio SSRC and video SSRC of granted participant is coded as the SSRC specified in IETF RFC 3550 [3]. Upon receiving the grant message, the sender A may store the received SSRC values and transmit the RTP packets or RTCP packets using the stored SSRC to the server. The Sender A may transmit the audio data packets (RTP/RTCP) using the SSRC “CC” and also may transmit the video data packets (RTP/RTCP) using SSRC “DD” to the server respectively. Consider, a new sender B sends a request to get access to send media stream to the server. The server may further generate a new unique and different SSRC for each of the media type corresponding to the sender B. For example, the server may generate the SSRC “EE” for the audio stream and SSRC “FF” for the video stream corresponding to the sender B. Upon the SSRC generation, the server may transmit media transmission notification message to a receiver C, where the media transmission notification message may include the SSRC values generated by the server for the media transmission/reception. Particularly, the receiver C may store the SSRC as “EE” for audio stream and SSRC value as “FF” for video stream corresponding to the sender B. Thus, the receiver may uniquely identify the media streams transmitted by the sender A and Sender B without the SSRC collision. Also, the server may transmit a grant message to the sender B, which includes the SSRC values for the audio stream as “EE” and for video stream as “FF”. The sender B, may store the received SSRC values from the server and may use it for transmitting RTP/RTCP packets to the receiver C through the server. For example, the sender B may use the SSRC “EE” for transmitting audio data packets to the receiver C through the server. Similarly, the sender B may use the SSRC “FF” for transmitting video transmitting to the receiver C through the server. Finally, upon sending/receiving transmission end request both sender A and Sender B may stop sending audio data packets and video data packets to the server.

In some embodiments, the media type may include at least one of carry audio, video text, haptic, sensor, avatar kind of data and the like. Server can generate unique id [SSRC or any other value] for each media type and send these IDs to UE in grant message, UE may use ids received in grant message in respective media type while transmitting media until transmission is ended.

In some embodiments, generating and handling of different and unique SSRC for audio and video stream in UE and server includes:

3. Receive Transmission Granted Message (R: Transmission Granted)

Upon receiving a Transmission Granted message from the transmission control server, the transmission participant:

1. shall store the audio SSRC of the Transmitting User and video SSRC of the Transmitting User and use it in the RTP media packets until the transmission is released.

4. Receive Media Transmission Notification Message (R: Media Transmission Notification)

Upon receiving the media transmission notification from the transmission control server, the transmission participant:

1. shall store the User ID, Audio SSRC of the Transmitting User and the Video SSRC of the Transmitting User;
2. if the Reception Mode field is set to ‘0’ indicating automatic reception mode:
   a. shall map the stored User ID, the Audio SSRC of the Transmitting User and the Video SSRC of the of the Transmitting User transmitting the media with the instance of ‘Transmission participant state transition diagram for basic reception control operation’ created in operation a);

5. Enter the ‘G: Transmit Taken’ State

When entering this state the transmission control arbitration logic in the transmission control server:

1. shall send a Transmission Grant message to the requesting transmission participant. The Transmission Grant message:
   a. shall include the stored audio SSRC in the Audio SSRC of the Transmitting User field and stored video SSRC in Video SSRC of the Transmitting User field;
2. shall send Media Transmission notification message to the reception control arbitration logic. The Media Transmission notification message:
   a. shall include the stored audio SSRC in in the Audio SSRC of the Transmitting User field and stored Video SSRC in the Video SSRC of the Transmitting User field 6. Timer T4 (Transmission Grant) Expired On expiry of timer T4 (Transmission Grant), the transmission control arbitration logic in the transmission control server:

1. shall send a Transmission Grant message to the granted transmission participant if counter C4 (Transmission Grant) has not reached its upper limit: The Transmission Grant message:
   a. shall include the granted MCVideo user’s stored audio SSRC in Audio SSRC of the Transmitting User field and stored video SSRC in Video SSRC of the Transmitting User field;

7. SIP Session initiated 1. if other MCVideo clients have the permission to send a media, the transmission control interface towards the MCVideo client in the transmission control server:
   a. shall include the granted MCVideo user’s audio and video SSRC in the Audio SSRC of the Transmitting User field and Video SSRC of the Transmitting User field
2. if the MCVideo client did not negotiate queueing of Transmission requests and if other MCVideo clients have the permission to send a media and if Cx (Simultaneous Transmission video) has reached it upper limit, the transmission control interface towards the MCVideo client in the transmission control server:
   a. shall include the granted MCVideo user’s audio and video SSRC in the audio SSRC of the Transmitting User field and video SSRC of the Transmitting User field;
3. if other MCVideo clients have permission to send a media, the transmission control interface towards the MCVideo client in the transmission control server:
   a. shall include the granted MCVideo user’s audio and video SSRC in the audio SSRC of the Transmitting User field and video SSRC of the Transmitting User field of transmitter field.

8. Receive Transmission Granted Message 1. shall send a Media Transmission Arbitration Taken Notification message a. shall include the Audio SSRC of the Transmitting User in the Audio SSRC of the Transmitting User field and the Video SSRC of the Transmitting User in the Video SSRC of the Transmitting User field;

9. Send Receive Media Request Message (Click Video Receive Button)

Upon receiving an indication from the user to request permission to receive media, the transmission participant:

1. shall create an instance of the 'Transmission participant state transition diagram for basic reception control operation';

2. shall map the stored User ID, the Audio SSRC of the Transmitting User and the Video SSRC of the user of the Transmitting User transmitting the media with the instance of 'Transmission participant state transition diagram for basic reception control operation created in operation 1

10. Receive Transmission Media Request Message (R: Transmission Media Request) or Receive an Implicit Transmission Request (R: Implicit Transmission Request)

Upon receiving a Transmission request message (from a transmission participant that is permitted to make a Transmission request) the transmission control arbitration logic in the transmission control server:

1. if the Transmission request is granted the transmission control server:

a. shall allocate and store one globally unique Audio SSRC and one globally unique Video SSRC for the Transmitting user who is granted the permission to send media, until the transmission associated to that Transmission request is released;

11. Timer T4 (Transmission Grant) Expired

On expiry of timer T4 (Transmission Grant), the transmission control arbitration logic in the transmission control server:

1. shall send a Transmission Granted message to the granted transmission participant if counter C4 (Transmission Grant) has not reached its upper limit: The Transmission Granted message a. shall include the stored Audio SSRC in the Audio SSRC of the Transmitting User field and the stored Video SSRC in the Video SSRC of the Transmitting User field;

12. Reception of Receive Media Request Message (R: Receive Media Request)

Upon receiving a Receive Media Request message, the reception control arbitration logic in the transmission control server:

a. shall store the Audio SSRC of the Transmitting User and the Video SSRC of the Transmitting User until the transmission is released;

13. Transmission Granted Message

The Transmission Granted message is sent by the transmission control server to inform the requesting transmission participant that it has been granted the permission to send media.

Transmission Granted message format is shown below:

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V=2|P| Subtype |  PT=APP=204  |          length               |
+-+-+-+-+-+-+-+-+-+-+-+-+-+-+-+-+-+-+-+-+-+-+-+-+-+-+-+-+-+-+-+-+
|      RTCP SSRC of sending transmission control entity         |
+-+-+-+-+-+-+-+-+-+-+-+-+-+-+-+-+-+-+-+-+-+-+-+-+-+-+-+-+-+-+-+-+
|                          name=MCV1                            |
+-+-+-+-+-+-+-+-+-+-+-+-+-+-+-+-+-+-+-+-+-+-+-+-+-+-+-+-+-+-+-+-+
|                        Duration field                         |
+-+-+-+-+-+-+-+-+-+-+-+-+-+-+-+-+-+-+-+-+-+-+-+-+-+-+-+-+-+-+-+-+
|          Audio SSRC of the Transmitting User field            |
+-+-+-+-+-+-+-+-+-+-+-+-+-+-+-+-+-+-+-+-+-+-+-+-+-+-+-+-+-+-+-+-+
|          Video SSRC of the Transmitting User field            |
+-+-+-+-+-+-+-+-+-+-+-+-+-+-+-+-+-+-+-+-+-+-+-+-+-+-+-+-+-+-+-+-+
|                  Transmission Priority field                  |
+-+-+-+-+-+-+-+-+-+-+-+-+-+-+-+-+-+-+-+-+-+-+-+-+-+-+-+-+-+-+-+-+
|                        User ID field                          |
+-+-+-+-+-+-+-+-+-+-+-+-+-+-+-+-+-+-+-+-+-+-+-+-+-+-+-+-+-+-+-+-+
|                       Queue Size field                        |
+-+-+-+-+-+-+-+-+-+-+-+-+-+-+-+-+-+-+-+-+-+-+-+-+-+-+-+-+-+-+-+-+
|         SSRC of queued transmission participant field         |
+-+-+-+-+-+-+-+-+-+-+-+-+-+-+-+-+-+-+-+-+-+-+-+-+-+-+-+-+-+-+-+-+
|                     Queued User ID field                      |
+-+-+-+-+-+-+-+-+-+-+-+-+-+-+-+-+-+-+-+-+-+-+-+-+-+-+-+-+-+-+-+-+
|                       Queue Info field                        |
+-+-+-+-+-+-+-+-+-+-+-+-+-+-+-+-+-+-+-+-+-+-+-+-+-+-+-+-+-+-+-+-+
|                 Transmission Indicator field                  |
+-+-+-+-+-+-+-+-+-+-+-+-+-+-+-+-+-+-+-+-+-+-+-+-+-+-+-+-+-+-+-+-+
```

Audio SSRC of the Transmitting User:

The Audio SSRC of Transmitting User field carries the SSRC value for Audio RTP stream of the user transmitting the media.

The content of the Audio SSRC of Transmitting User is coded as the SSRC specified in clause 9.2.3.X Video SSRC of the Transmitting User:

The Video SSRC of Transmitting User field carries the SSRC value for Video RTP stream of the user transmitting the media.

The content of the Video SSRC of the Transmitting User is coded as the SSRC specified in clause 9.2.3.Y.

14. Media Transmission Notification

The Media transmission notification message is sent by the transmission control server to notify the transmission control participant that a media transmission is available from another user.

Media transmission notification message format is shown below:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| Subtype |  PT=APP=204  |        length                 |
+-+-+-+-+-+-+-+-+-+-+-+-+-+-+-+-+-+-+-+-+-+-+-+-+-+-+-+-+-+-+-+-+
|     RTCP SSRC of sending transmission control entity          |
+-+-+-+-+-+-+-+-+-+-+-+-+-+-+-+-+-+-+-+-+-+-+-+-+-+-+-+-+-+-+-+-+
|                          name=MCV1                            |
+-+-+-+-+-+-+-+-+-+-+-+-+-+-+-+-+-+-+-+-+-+-+-+-+-+-+-+-+-+-+-+-+
|           User Id of the Transmitting User field              |
+-+-+-+-+-+-+-+-+-+-+-+-+-+-+-+-+-+-+-+-+-+-+-+-+-+-+-+-+-+-+-+-+
|         Audio SSRC of the Transmitting User field             |
+-+-+-+-+-+-+-+-+-+-+-+-+-+-+-+-+-+-+-+-+-+-+-+-+-+-+-+-+-+-+-+-+
|         Video SSRC of the Transmitting User field             |
+-+-+-+-+-+-+-+-+-+-+-+-+-+-+-+-+-+-+-+-+-+-+-+-+-+-+-+-+-+-+-+-+
|       Permission to Request the Transmission field            |
+-+-+-+-+-+-+-+-+-+-+-+-+-+-+-+-+-+-+-+-+-+-+-+-+-+-+-+-+-+-+-+-+
|               Transmission Indicator field                    |
+-+-+-+-+-+-+-+-+-+-+-+-+-+-+-+-+-+-+-+-+-+-+-+-+-+-+-+-+-+-+-+-+
|                     Track Info field                          |
+-+-+-+-+-+-+-+-+-+-+-+-+-+-+-+-+-+-+-+-+-+-+-+-+-+-+-+-+-+-+-+-+
|                  Functional Alias field                       |
+-+-+-+-+-+-+-+-+-+-+-+-+-+-+-+-+-+-+-+-+-+-+-+-+-+-+-+-+-+-+-+-+
|                   Reception Mode field                        |
+-+-+-+-+-+-+-+-+-+-+-+-+-+-+-+-+-+-+-+-+-+-+-+-+-+-+-+-+-+-+-+-+
```

Audio SSRC of the Transmitting User:

The Audio SSRC of Transmitting User field carries the SSRC value for Audio RTP stream of the user transmitting the media.

The content of the Audio SSRC of Transmitting User is coded as the SSRC specified in clause 9.2.3.X.

Video SSRC of the Transmitting User:

The Video SSRC of Transmitting User field carries the SSRC value for Video RTP stream of the user transmitting the media.

The content of the Video SSRC of the Transmitting User is coded as the SSRC specified in clause 9.2.3.Y.

Figure 3:
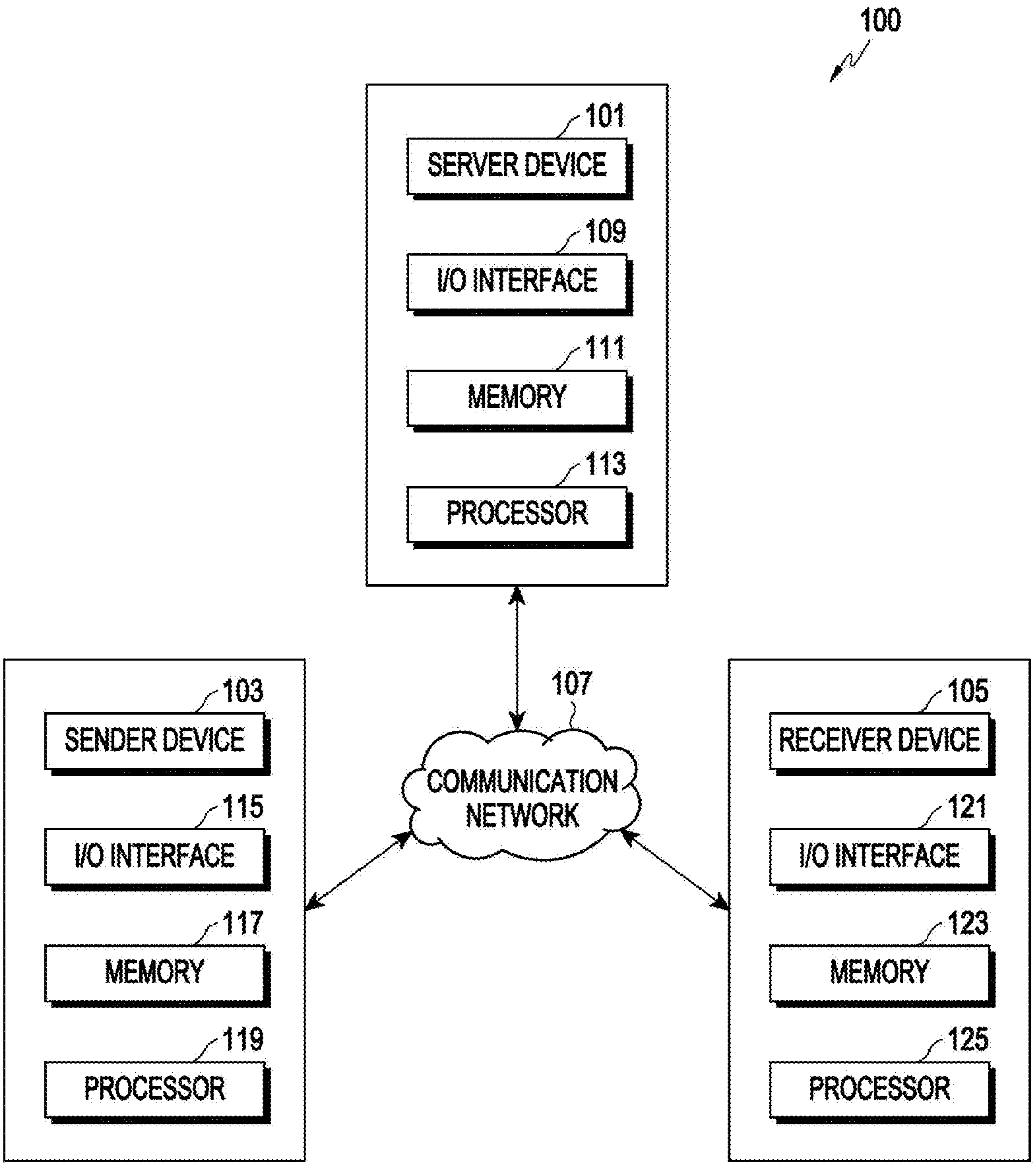
FIG. 3 illustrates managing Synchronization Source (SSRC) collisions in Mission Critical Services (MCX), according to an embodiment of the disclosure.

FIG. 3 shows managing Synchronization Source (SSRC) collisions in Mission Critical Services (MCX) according to an embodiment of the disclosure.

FIG. 3 shows an environment 100 for managing Synchronization Source (SSRC) collisions in Mission Critical Services (MCX).

Referring to FIG. 3, the environment 100 includes a server device 101 connected with a sender device 103 and a receiver device 105. A person skilled in the art may understand that FIG. 1 is for illustrative purposes and only one sender device 103 and only one receiver device 105 are illustrated. However, one or more sender devices (a sender device 1031, a sender device 1032, . . . a sender device 103N, where N being a positive integer number; not shown explicitly in figures) and one or more receiver devices (a receiver device 1051, a receiver device 1052, . . . a receiver device 105N, where N being a positive integer number; not shown explicitly in figures) may be connected to the server device 101. The server device 101 may include an architecture for transmitting multimedia communication services and Mission Critical Services (MCX) such as, but not limited to, voice, video, text messaging, Mission Critical Push to Talk (MCPTT) content, Mission Critical Video (MCVIDEO), and haptic sensor data. The server device 101 manages the transmission of the media streams between one or more sender devices and one or more receiver devices. In an embodiment, the one or more sender devices may correspond to User Equipment (UE) of users or operators who may wish to transmit media streams to a receiver device 105. In an embodiment, the media streams may include live images/videos captured by the user operating the sender device 103. In an embodiment, the one or more receiver devices may correspond to UEs of users or operators present, who wish to provide support to the users or operators of the one or more sender devices. The one or more sender devices and the one or more receiver devices may include, but are not limited to, a smartphone, a personal computer, a laptop, a tablet, or the like. The one or more sender devices and the one or more receiver devices may communicate with the server device 101 via a communication network 107 such as, but not limited to, Long Term Evolution (LTE), Global System for Mobile communication (GSM), 3rd Generation Partnership Project (3GPP), and the like.

Prior to initiation of transmission or reception, an MCX session is established between the server device 101 and one or more sender devices and between the server device 101 and the one or more receiver devices. Upon the establishment of the MCX session, the server device 101 receives a request message from the one or more sender devices during the MCX session. The request message received from the one or more sender devices may comprise a request to transmit one or more media streams to the one or more receiver devices. In an embodiment, the one or more media streams may comprise audio or videos, captured by the user operating the sender device 103.

Upon receiving the request message, the server device 101 may determine a unique SSRC identifier for each media stream of the one or more media streams received in the request message. In an embodiment, the server device 101 may determine the unique SSRC identifier by first determining whether one or more historic SSRC identifiers from a prestored SSRC identifier list, is associated with the one or more media streams of the MCX session. The server device 101 is configured to maintain a record of all the SSRC identifiers generated for a current MCX session. Therefore, the server device 101 is configured to maintain the prestored SSRC identifier list which comprises the one or more historic SSRC identifiers which were previously generated for the corresponding MCX session. Thus, each time the unique SSRC identifier is generated, the server device 101 adds it to the prestored SSRC identifier list which is maintained for the respective MCX session. In an embodiment, the server device 101 may also remove the SSRC identifiers from the prestored SSRC identifier list as soon as the transmission is ended.

Therefore, in order to determine the unique SSRC identifier, the server device 101 may first determine whether the one or more prestored SSRC identifiers were generated in the current MCX session, for the one or more media streams which are already transmitted to the receiver device 105. Particularly, the SSRC identifiers may enter an inactive state when the transmission of the one or more media streams for which the SSRC identifiers were generated is successful (i.e., the SSRC identifier becomes inactive after completion of the transmission for which it was generated). Particularly, the SSRC identifier entering the inactive state corresponds to the SSRC identifier being available for another transmission. Thus, once the SSRC identifiers enter the inactive state, the server device 101 may add it to the prestored SSRC identifier list such that these SSRC identifiers can be used for further transmissions. Therefore, as the SSRC identifier which was previously generated in the same MCX session is inactive, the server device 101 may assign the prestored SSRC identifier for transmitting a different media stream. In an embodiment, when the prestored SSRC identifier list is empty or when all the historic SSRC identifiers are active in the current MCX session, the server device 101 may determine the SSRC identifier by generating the unique SSRC identifier for the corresponding one or more media streams.

In an embodiment, the server device 101 may determine that the prestored SSRC identifier is not associated with the current MCX session. Therefore, in this case the server device 101 may first discard the SSRC identifier which is not associated with the current MCX session by removing it from the prestored SSRC identifier list. Further, the server device 101 may determine the SSRC identifier by generating the unique SSRC identifier for the corresponding one or more media streams. In another embodiment, generating the unique SSRC identifier for each media stream of the one or more media streams may further comprise determining whether the generated SSRC identifier is appearing in the prestored SSRC identifier list. Further, if the generated SSRC identifier is included in the prestored SSRC identifier list, the server device 101 may regenerate the SSRC identifier until it does not appear in the prestored SSRC identifier list.

Upon determining the SSRC identifier for each of the one or more media stream requested by the sender device 103, the server device 101 may transmit the determined SSRC identifiers to the one or more sender devices and to the one or more receiver devices. The SSRC identifiers are sent to the one or more sender devices with a grant message which is indicative of a permission from the server device 101, to transmit the one or more media streams using the SSRC identifier transmitted with the grant message. The SSRC identifiers are sent to the one or more receiver devices with a notification message which is indicative of a request to receive the one or more media streams. In an embodiment, after sending the SSRC identifiers in the notification, the server device 101 may wait for a predefined time period to receive an acknowledgment for the notification message, from at least one receiver device. Parallelly, upon sending the grant message, the server device 101 may receive the one or more media streams along with respective SSRC identifiers, from the one or more sender devices. Thereafter, once the server device 101 receives the acknowledgement within the predefined time period, from the at least one receiver device and further receives the one or more media streams comprising respective SSRC identifier, from the one or more sender devices, the server device 101 may perform transmission of the one or more media streams to the at least one receiver device which is accepting reception. In an embodiment, when the acknowledgement is not received from at least one receiver device, the server device 101 may transmit a revoke message indicative of a message to stop sending further media streams, to the sender device 103. Thus, in this manner the disclosure provides generation of the unique SSRC identifier due to which the SSRC collisions are avoided.

In an embodiment of the disclosure, for managing the SSRC collisions in MCX, the sender device 103 performs the following operations. The sender device 103 sends the request message to the server device 101 during the MCX session. The sender device 103 further receives the SSRC identifiers in the grant message. Thereafter, once the sender device 103 receives the grant message with the SSRC identifiers, the sender device 103 may transmit the one or more media streams associated with the respective SSRC identifiers, to the server device 101.

In an embodiment of the disclosure, for managing the SSRC collisions in MCX, the receiver device 105 may perform the following operations. The receiver device 105 may receive the SSRC identifier in the notification message which indicates the request to receive one or more media streams. The receiver device 105 may transmit the acknowledgement for the request to receive the one or more media streams, based on an availability of resources to satisfy the request. In an embodiment, the receiver device 105 may not send the acknowledgement due to unavailability of the resources. In such instances, the server device 101 waits for the predefined time period and on failure to receive the acknowledgement from the at least one receiver device, the server device 101 may transmit a revoke message to the sender device 103. The revoke message is indicative of a message to stop sending further media streams. However, when the receiver device 105 sends the acknowledgement within the predefined time period, the server device 101 may transmit the one or more media streams associated with the SSRC identifiers.

Figure 4:
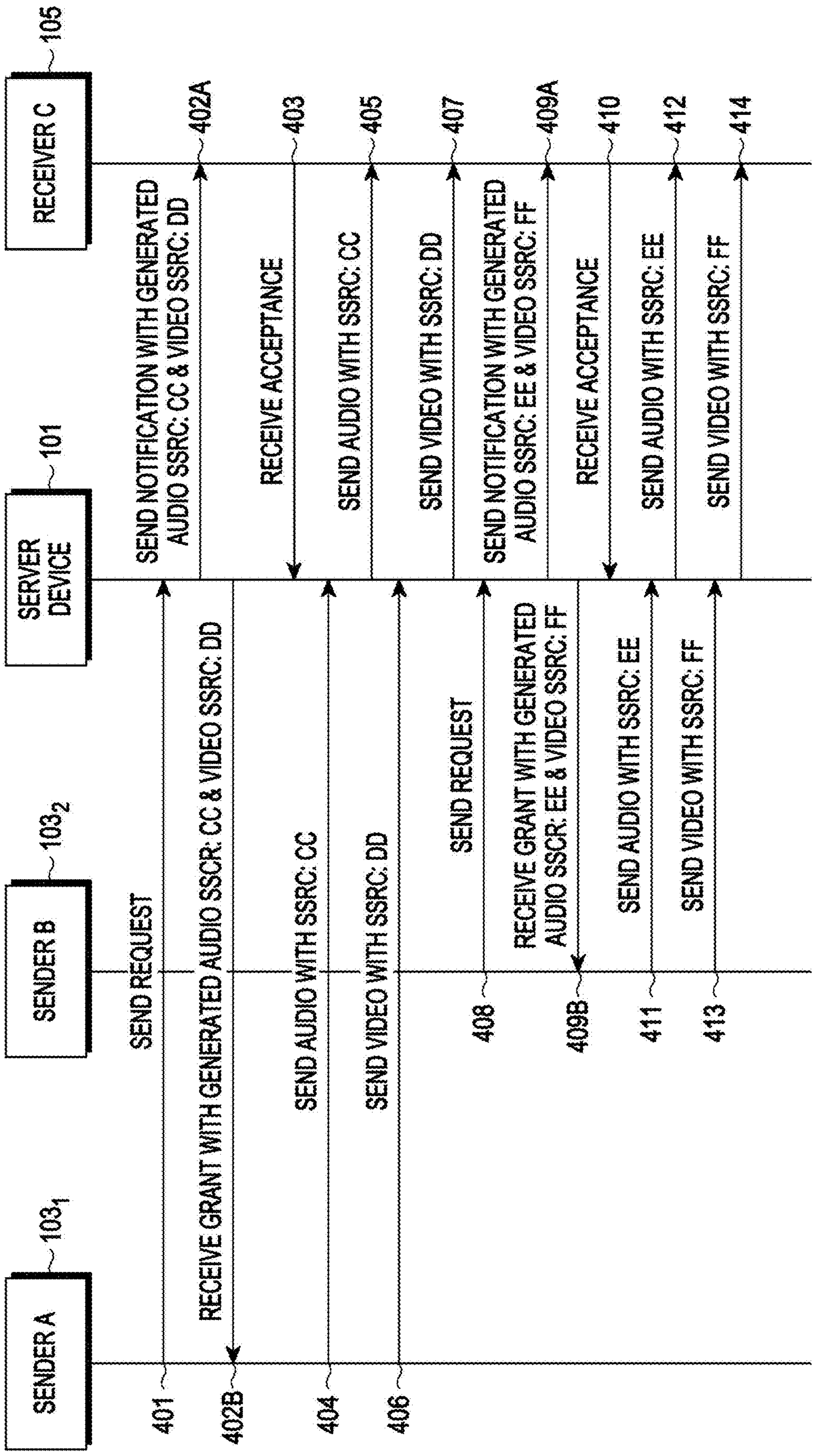
FIG. 4 illustrates a sequence diagram for managing Synchronization Source (SSRC) collisions in Mission Critical Services (MCX), according to an embodiment of the disclosure.

FIG. 4 illustrates a sequence diagram for managing SSRC collisions in an MCX session according to an embodiment of the disclosure.

Figure 2:
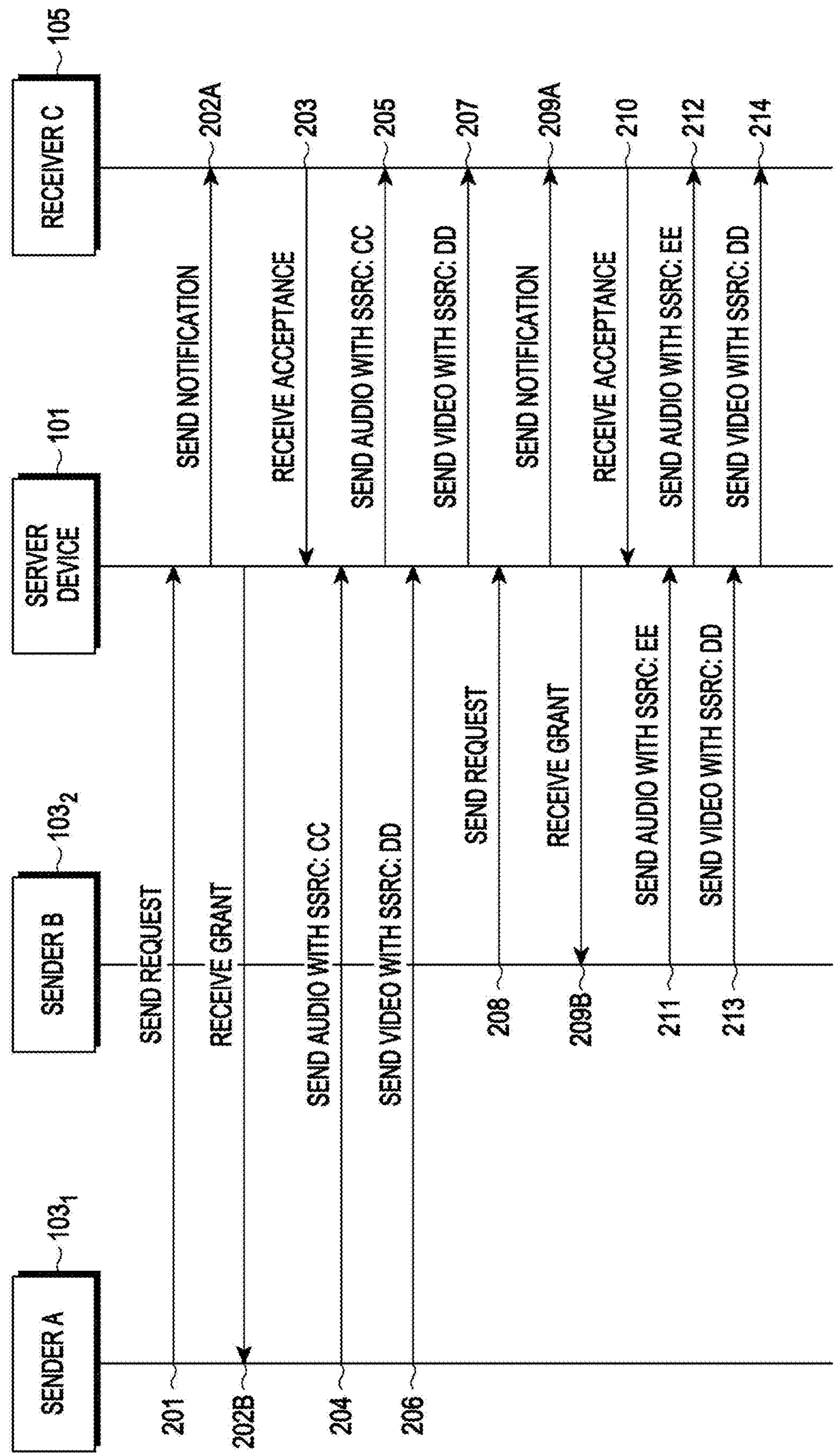
FIG. 2 illustrates a sequence diagram for performing SSRC collision at receiver device according to the related art.

Consider similar situation as explained in FIG. 2, wherein a sender device 1031 and a sender device 1032 establish the MCX session with the server device 101 prior to initiating the transmission or reception.

Herein, at operation 401, the sender device 1031 may send a request to the server device 101 to grant him permission to send the media stream which may include a live audio and video stream. Once the request is received, the server device 101 generates the SSRC: CC for audio stream and SSRC: DD for video stream.

At operations 402A and 402B, the server device 101 may send a grant message with the generated SSRC identifiers to the sender device 1031 and further sends a transmission notification with the generated SSRC identifiers to all other members in the group (i.e., receiver device 105 in this example).

At operation 403, the receiver device 105 may send a reception of an acceptance notification when the receiver device 105 is interested to view the content which sender device 1031 wishes to send.

At operation 404, the sender device 1031 may send all audio packets with SSRC: CC to the server device 101.

At operation 405, the receiver device 105 receives the audio stream with SSRC: CC from the server device 101.

At operation 406, the sender device 1031 sends all video packets with SSRC: DD to the server device 101.

At operation 407, the receiver device 105 receives the video stream with SSRC: DD from the server device 101.

At operation 408, the sender device 1032 may send a request to the server device 101 to grant him permission to send the media stream which may include the live audio and video stream. Once the request is received, the server device 101 generates the SSRC: EE for audio stream and SSRC: FF for video stream.

At operations 409A and 409B, the server device 101 may send a grant message with the generated SSRC identifiers to the sender device 1032 and further sends a transmission notification with the generated SSRC identifiers to all other members in the group (i.e., receiver device 105 in this example).

At operation 410, the receiver device 105 may send a reception of an acceptance notification when the receiver device 105 is interested to view the content which sender device 1032 wishes to send.

At operation 411, the sender device 1032 sends all audio packets with SSRC: EE to the server device 101.

At operation 412, the receiver device 105 receives the audio stream with SSRC: EE from the server device 101.

At operation 413, the sender device 1032 sends all video packets with SSRC: FF to the server device 101.

At operation 414, the receiver device 105 receives the video stream with SSRC: FF from the server device 101.

From operations 405, 407, 412 and 414, it is observed that the receiver device 105 has received two sets of media streams which comprises two streams of each media type (i.e., audio & video). It is further observed that each media stream is associated with a unique SSRC identifier. Therefore, the receiver device 105 may process all the audio and video packets and display the media streams in a User Interface (UI).

Figure 5:
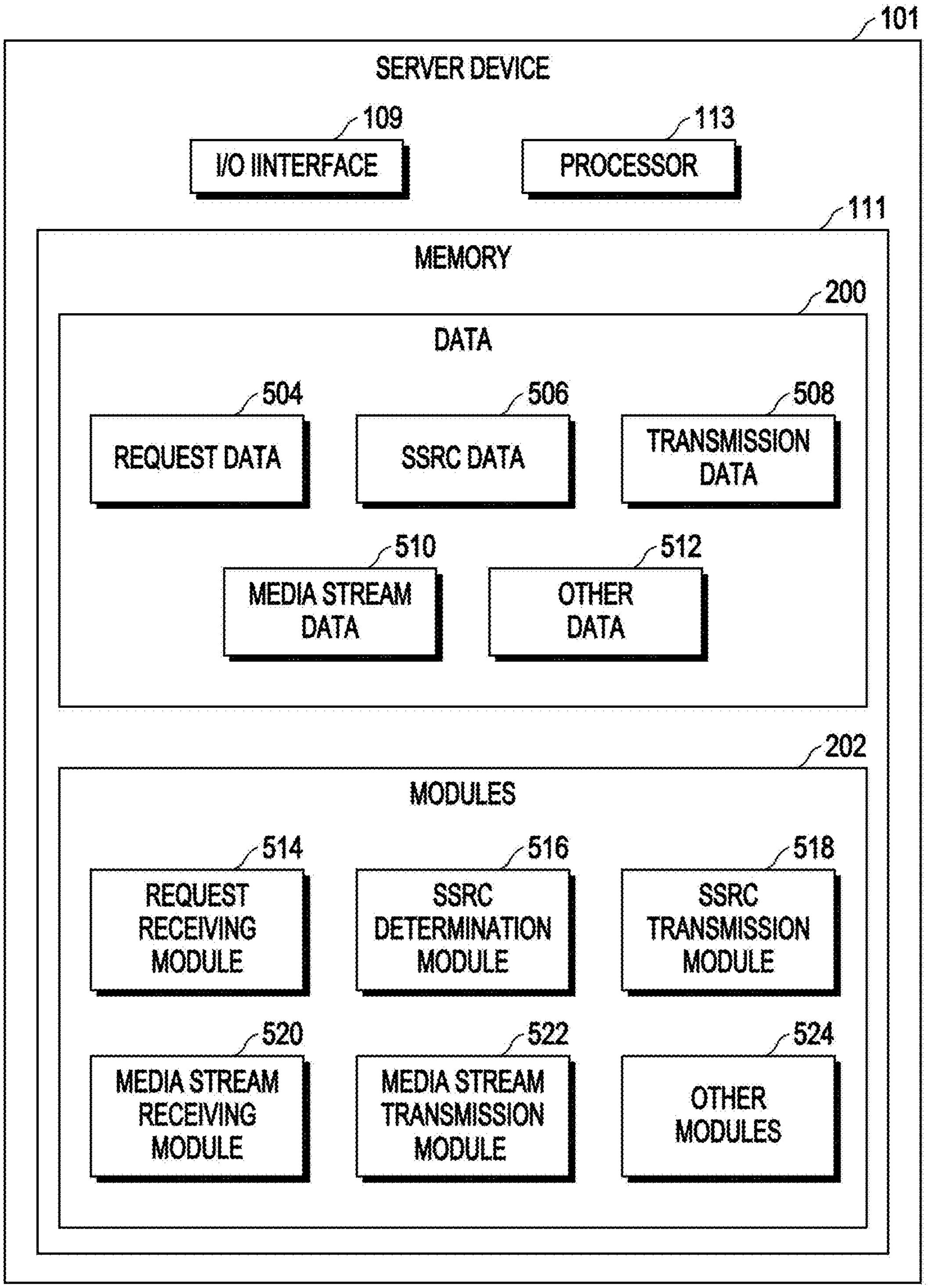
FIG. 5 illustrates a detailed block diagram of a server device, according to an embodiment of the disclosure.

FIG. 5 illustrates a detailed block diagram of a server device, according to an embodiment of the disclosure.

FIG. 5 illustrates an internal architecture of the server device 101 according to an embodiment of the disclosure. The server device 101 may include at least one Central Processing Unit ("CPU" or "processor") 113 and memory 111 storing instructions executable by the at least one processor 113. The processor 113 may comprise at least one data processor for executing program components for executing user or system-generated requests. The memory 111 is communicatively coupled to the processor 113. The server device 101 further comprises an Input/Output (I/O) interface 109. The I/O interface 109 is coupled with the processor 113 through which an input signal or/and an output signal is communicated.

In some implementations, the server device 101 may include data 200 and modules 202. As an example, the data 200 may be stored within the memory 111 associated with the server device 101. In some embodiments, data 200 may include, for example, request data 504, SSRC data 506, transmission data 508, media stream data 510 and other data 512. In some embodiments, the data 200 may be stored in the memory 111 in form of various data structures.

The request data 504 may include requests received from one or more sender devices. The request received from the one or more sender devices may correspond to a request to transmit one or more media streams to the one or more receiver devices.

The SSRC data 506 may include unique Synchronization Source (SSRC) identifiers generated by the server device 101. In an embodiment, the SSRC data 506 may include a prestored SSRC identifier list which may be stored on the server device 101. The prestored SSRC identifier list may include one or more historic SSRC identifiers which were previously generated by the server device 101.

In an embodiment, the transmission data 508 may include the SSRC identifiers and the one or more media streams which are transmitted by the server device 101 to the sender device 103 and the receiver device 105. In an embodiment, the transmission data may further include a grant message, a notification message, and an acknowledgement, for each request.

The media stream data 510 includes the streaming data that the sender device 103 wishes to share with the receiver device 105. The media stream data 510 may include multimedia content such as, but not limited to, text, graphics, video, audio, Mission Critical Push to Talk (MCPTT) content, Mission Critical Video (MCVD), and haptic sensor data, and the like.

The other data 512 may be stored data, including temporary data and temporary files, generated by the modules 202 for performing the various functions of the server device 101. In an embodiment, the data 200 in the memory 111 are processed by the one or more modules 202 present within the memory 111 of the server device 101.

The one or more modules 202 along with the data 200 functions to manage SSRC collisions in Mission Critical Services (MCX) in the server device 101. In one implementation, the one or more modules 202 may include, but are not limited to, a request receiving module 514, an SSRC determination module 516, an SSRC transmission module 518, a media stream receiving module 220, a media stream transmission module 522 and one or more other modules 524.

In an embodiment, the one or more modules 202 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 202 may be communicatively coupled to the processor 113 for performing one or more functions of the server device 101. The said modules 202 when configured with the functionality defined in the disclosure will result in a novel hardware.

In an embodiment, the request receiving module 514 may receive the request data 504 which may include a transmission request from one or more sender devices during a session, to transmit one or more media streams to one or more receiver devices. In an embodiment, the session may correspond to a MCX session. Further, on receiving the transmission request, the request receiving module 514 may store the request data 504. For example, referring back to the flow diagram of FIG. 2, it is seen that at operation 1, a request is received by the request receiving module 514 of the server device 101. Further, when the request receiving module 514 receives the request for transmission of the one or more media streams from a new sender device, the request receiving module 514 also determines how many other members (i.e., other senders) are transmitting at that instance. Therefore, the request receiving module 514 determines whether a predefined maximum limit of the number of sender devices to operate in the current session is not crossing on including the new sender device. On determining that the predefined maximum limit of the number of sender devices to operate in the current session is not crossing, the request receiving module 514 may immediately send grant to the new sender device. In an embodiment, if the predefined maximum limit of the number of sender devices to operate in the current session is crossing on including the new sender device, then the request receiving module 514 terminates the request received from a sender device associated with a low priority stream and gives access to the new sender device (here it is assumed that the request received from the new sender device has higher priority compared to ongoing transmissions). In an embodiment, when the request associated with the new sender device itself has low priority, then the request receiving module 514 may directly reject the request received from the new sender device (including the instance when the request crosses the maximum limit).

In an embodiment, the SSRC determination module 516 is configured to receive the request data 504. Upon receiving the request data 504, the SSRC determination module 516 is configured to determine a unique SSRC identifier for each media stream of the one or more media streams received in the transmission request. The SSRC determination module 516 is configured to first determine whether the one or more historic SSRC identifiers from a prestored SSRC identifier list are associated with the one or more media streams of the MCX session. In an embodiment, the SSRC determination module 516 maintains a record of all the SSRC identifiers generated for a current MCX session. The SSRC determination module 516 stores the prestored SSRC identifier list which comprises the one or more historic SSRC identifiers which were previously generated for the corresponding MCX session. Thus, each time the unique SSRC identifier is generated, the SSRC determination module 516 adds it to the prestored SSRC identifier list.

The SSRC determination module 516 determines the unique SSRC identifier by determining whether the one or more prestored SSRC identifiers were generated in the current MCX session, for the one or more media streams which are already transmitted to the receiver device 105. In an embodiment, the SSRC identifiers may turn inactive when the transmission of the one or more media streams for which the SSRC identifiers were generated is successful. Thus, once they are inactive, the SSRC determination module 516 adds it to the prestored SSRC identifier list. Therefore, as the SSRC identifier which was previously generated in the same MCX session is inactive, the SSRC determination module 516 may assign the prestored SSRC identifier for transmitting a different media stream. In an embodiment, when the prestored SSRC identifier list is empty or when all the historic SSRC identifiers are active in the current MCX session, the SSRC determination module 516 may determine the SSRC identifier by generating the unique SSRC identifier for the corresponding one or more media streams.

In another embodiment, when the SSRC determination module 516 determines that the prestored SSRC identifier is not associated with the current MCX session, the SSRC determination module 516 may first discard the corresponding SSRC identifier by removing it from the prestored SSRC identifier list. Further, the SSRC determination module 516 may determine the SSRC identifier by generating the unique SSRC identifier for the corresponding one or more media streams.

In yet another embodiment, the SSRC determination module 516 may further determine whether the generated SSRC identifier is appearing in the prestored SSRC identifier list. For instance, if the generated SSRC identifier is included in the prestored SSRC identifier list, then the SSRC determination module 516 regenerates the SSRC identifier until it does not appear in the prestored SSRC identifier list in order to maintain uniqueness of the SSRC identifiers.

In an embodiment, the SSRC transmission module 518 is configured to receive the unique SSRC identifiers determined, from the SSRC determination module 516. Upon receiving, the SSRC transmission module 518 is configured to transmit the determined SSRC identifiers to the sender device 103 and the receiver device 105. In an embodiment, the SSRC transmission module 518 is configured to transmit the SSRC identifiers to the sender devices with the grant message which is indicative of a permission from the server device 101, to transmit the one or more media streams using the SSRC identifier transmitted with the grant message. In an embodiment, the SSRC transmission module 518 is configured to transmit the SSRC identifiers to the receiver device 105 with the notification message which is indicative of a request to receive the one or more media streams. For example, as seen from FIG. 4, operation 2 is performed by the SSRC transmission module 518, wherein the grant message and the notification message along with the respective SSRC identifiers are transmitted to the sender device 103 and the receiver device 105, respectively.

Returning to FIG. 5, after the SSRC transmission module 518 transmits the SSRC identifiers to the sender device 103 and the receiver device 105, the SSRC transmission module 518 provides the control of performing further operations to the media stream receiving module 520.

The media stream receiving module 220 is configured to receive the one or more media streams along with respective SSRC identifiers, from the one or more sender devices. For example, as seen from FIG. 4, in operations 4 and 6, the media stream receiving module 520 receives the media streams such as audio and video along with their respective SSRC identifiers. As seen from FIG. 4, the SSRC identifier associated with the audio stream corresponds to "CC" and the SSRC identifier associated with the video stream corresponds to "DD".

Returning to FIG. 5, upon receiving the media stream data 510 from the sender device 103, the media stream receiving module 520 transmits the media stream data 510 to the media stream transmission module 522. The media stream transmission module 522 is configured to transmit the received media stream data 510 to the receiver device 105. However, before transmitting the media stream data 510, to the receiver device 105, the media stream transmission module 522 waits for a predefined time period to receive the acknowledgment for the notification message, from at least one receiver device. Thereafter, once the media stream transmission module 522 receives the acknowledgement within the predefined time period, from the at least one receiver device, the media stream transmission module 522 performs transmission of the media stream data 510 to the at least one receiver device which is accepting transmission. In an embodiment, when the acknowledgement is not received, the media stream transmission module 522 transmits a revoke message indicative of a message to stop sending further media streams, to the sender device 103.

Figure 6:
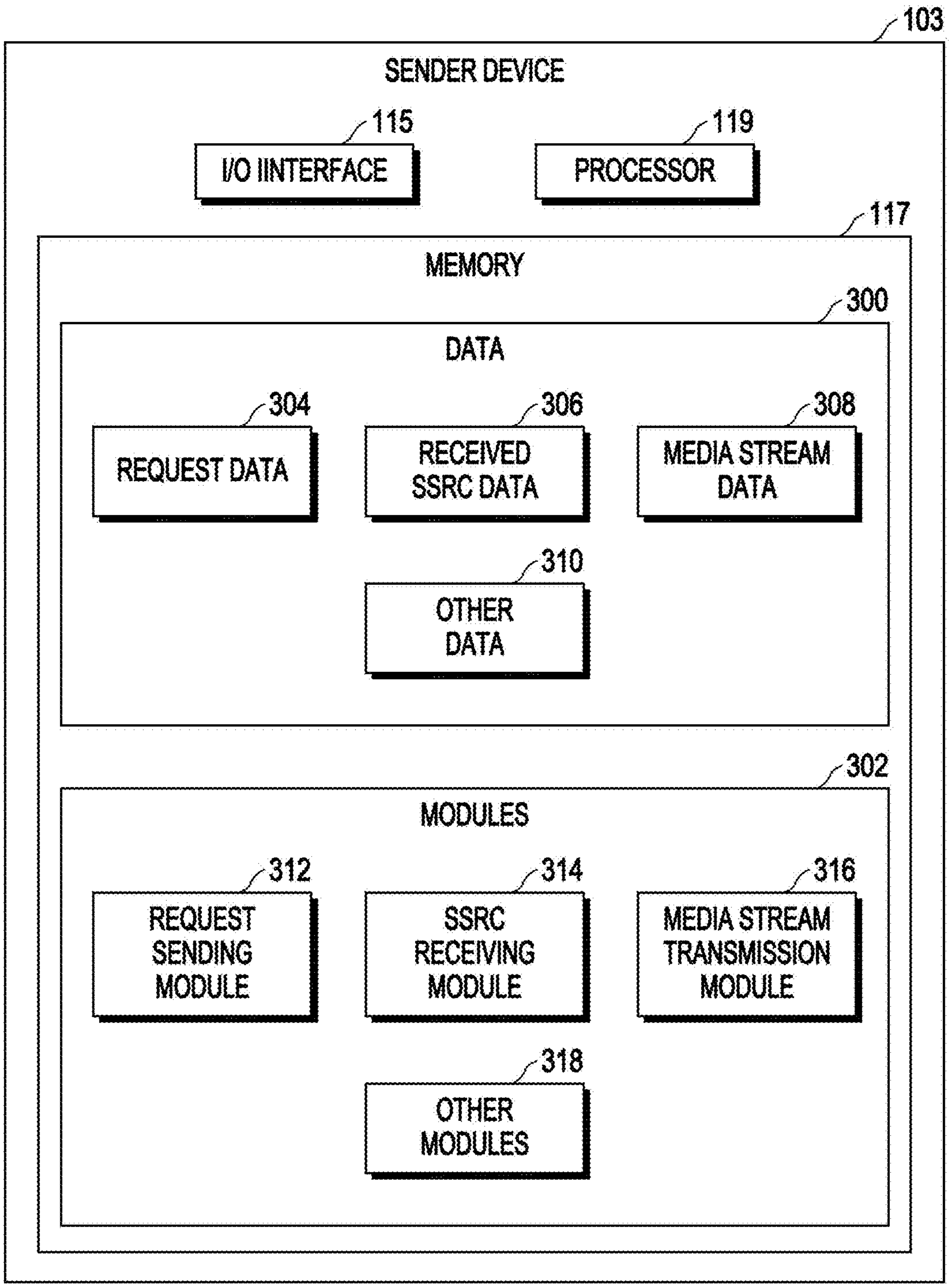
FIG. 6 illustrates a detailed block diagram of a sender device, according to an embodiment of the disclosure.

FIG. 6 illustrates a detailed block diagram of a sender device, according to an embodiment of the disclosure.

FIG. 6 illustrates an internal architecture of the sender device 103 according to an embodiment of the disclosure. The sender device 103 may include at least one Central Processing Unit ("CPU" or "processor") 119 and memory 117 storing instructions executable by the at least one processor 119. The processor 119 may comprise at least one data processor for executing program components for executing user or system-generated requests. The memory 117 is communicatively coupled to the processor 119. The sender device 103 further comprises an Input/Output (I/O) interface 115. The I/O interface 115 is coupled with the processor 119 through which an input signal or/and an output signal is communicated.

In some implementations, the sender device 103 may include data 300 and modules 302. As an example, the data 300 may be stored within the memory 117 associated with the sender device 103. In some embodiments, data 300 may include, for example, request data 304, received SSRC data 306, media stream data 308, and other data 310. In some embodiments, the data 300 may be stored in the memory 117 in form of various data structures.

The request data 304 may include requests transmitted from one or more sender devices to a server device 101. The request sent from the one or more sender devices may correspond to a request to transmit one or more media streams to one or more receiver devices.

The received SSRC data 306 may include unique Synchronization Source (SSRC) identifiers generated by the server device 101.

The media stream data 308 includes the streaming data that the sender device 103 wishes to share with the receiver device 105. The media stream data 308 may include multimedia content such as text, graphics, video, audio, Mission Critical Push to Talk (MCPTT) content, Mission Critical Video (MCVD), and haptic sensor data, and the like.

The other data 310 may be stored data, including temporary data and temporary files, generated by the modules 302 for performing the various functions of the sender device 103. In an embodiment, the data 300 in the memory 117 are processed by the one or more modules 302 present within the memory 117 of the sender device 103.

The one or more modules 302 along with the data 300 functions to manage SSRC collisions in Mission Critical Services (MCX) in the sender device 103. In one implementation, the one or more modules 302 may include, but are not limited to, a request sending module 312, an SSRC receiving module 314, a media stream transmission module 316, and one or more other modules 318.

In an embodiment, the one or more modules 302 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 302 may be communicatively coupled to the processor 119 for performing one or more functions of the sender device 103. The said modules 302 when configured with the functionality defined in the disclosure will result in a novel hardware.

The request sending module 312 may send the request data 304 which may include a transmission request which is to be sent during a session, for transmitting one or more media streams to one or more receiver devices. In an embodiment, the session may correspond to a MCX session. For example, referring back to the flow diagram of FIG. 4, it is seen that at operation 1, a request is sent by the request sending module 312 of the sender device 103.

Returning to FIG. 6, upon sending the request data 304 to the server device 101, the request sending module 312 provides the control of performing further operations to the SSRC receiving module 314. The SSRC receiving module 314 is configured to receive a grant message along with SSRC identifiers generated by the server device 101. For example, as seen from FIG. 4, in operation 2 on sender's end, the SSRC receiving module 314 of the sender device 103, receives the grant message with the SSRC identifiers generated for audio and video streams.

Returning to FIG. 6, upon receiving the SSRC data 306 by the SSRC receiving module 314, it transmits the SSRC data 306 to the media stream transmission module 316. Once the media stream transmission module 316 receives the SSRC data 306, it transmits the media stream data 308 to the server device 101. In an embodiment, the media stream transmission module 316 may receive a revoke message indicative of a message to stop sending further media stream data 308 to the sender device 103. In this case, the media stream transmission module 316 stops sending further media stream data 308 to the sender device 103. For example, as seen from FIG. 4, operations 4 and 6 show that the media stream transmission module 316 transmits the media streams such as audio and video along with their respective SSRC identifiers.

Figure 7:
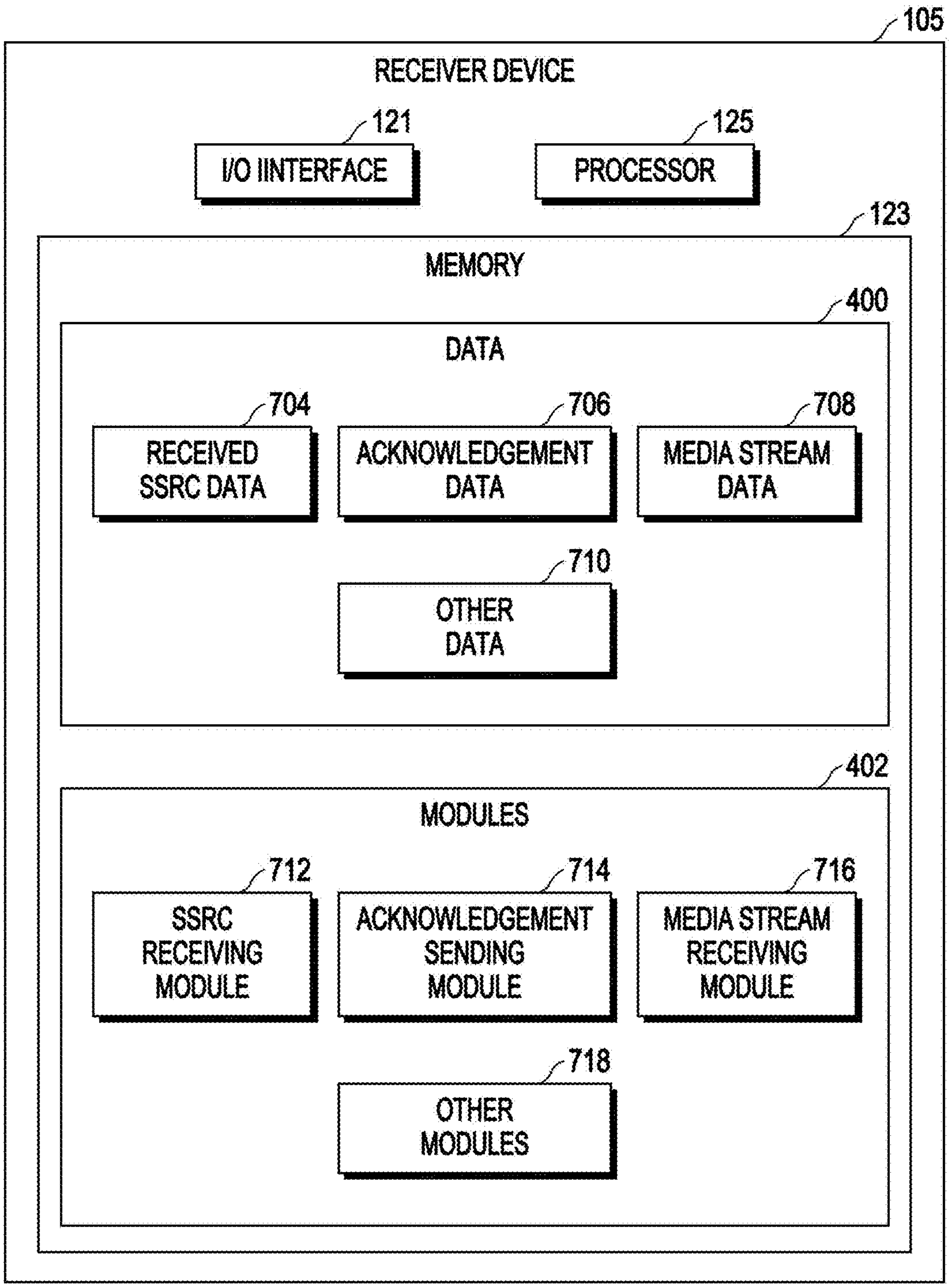
FIG. 7 illustrates a detailed block diagram of a receiver device, according to an embodiment of the disclosure.

FIG. 7 illustrates a detailed block diagram of a receiver device, according to an embodiment of the disclosure.

FIG. 7 illustrates an internal architecture of the receiver device 105 according to an embodiment of the disclosure.

The receiver device 105 may include at least one Central Processing Unit ("CPU" or "processor") 125 and memory 123 storing instructions executable by the at least one processor 125. The processor 125 may comprise at least one data processor for executing program components for executing user or system-generated requests. The memory 123 is communicatively coupled to the processor 125. The receiver device 105 further comprises an Input/Output (I/O) interface 121. The I/O interface 121 is coupled with the processor 125 through which an input signal or/and an output signal is communicated.

In some implementations, the receiver device 105 may include data 400 and modules 402. As an example, the data 400 may be stored within the memory 123 associated with the receiver device 105. In some embodiments, data 400 may include, for example, received SSRC data 704, acknowledgement data 706, media stream data 708, and other data 710. In some embodiments, the data 400 may be stored in the memory 123 in form of various data structures.

The received SSRC data 704 may include unique Synchronization Source (SSRC) identifiers generated by the server device 101.

The acknowledgement data 706 may include the acknowledgement sent by the receiver device 105 upon receiving a request to receive one or more media streams from the sender device 103.

The media stream data 708 may include streaming data that the sender device 103 wishes to share with the receiver device 105. The media stream data 308 may include multimedia content such as text, graphics, video, audio, Mission Critical Push to Talk (MCPTT) content, Mission Critical Video (MCVD), and haptic sensor data, and the like.

The other data 310 may be stored data, including temporary data and temporary files, generated by the modules 302 for performing the various functions of the sender device 103. In an embodiment, the data 300 in the memory 117 are processed by the one or more modules 302 present within the memory 117 of the sender device 103.

The one or more modules 402 along with the data 400 functions to manage SSRC collisions in Mission Critical Services (MCX) in the receiver device 105. In one implementation, the one or more modules 402 may include, but are not limited to, an SSRC receiving module 712, an acknowledgement sending module 714, a media stream receiving module 416, and one or more other modules 718.

In an embodiment, the one or more modules 402 may be implemented as dedicated units. As used herein, the term module refers to an application specific integrated circuit (ASIC), an electronic circuit, a field-programmable gate arrays (FPGA), Programmable System-on-Chip (PSC), a combinational logic circuit, and/or other suitable components that provide the described functionality. In some implementations, the one or more modules 402 may be communicatively coupled to the processor 125 for performing one or more functions of the receiver device 105. The said modules 402 when configured with the functionality defined in the disclosure will result in a novel hardware.

The SSRC receiving module 712 may receive a request during a session, for receiving the one or more media streams from one or more sender devices. In an embodiment, the session may correspond to a MCX session. The SSRC receiving module 712 is configured to receive the request in a notification message along with SSRC identifiers generated by the server device 101. For example, as seen from FIG. 4, in operation 2 on receiver's end, the SSRC receiving module 712 of the receiver device 105, receives the notification message with the SSRC identifiers generated for audio and video streams.

Returning to FIG. 7, upon receiving the notification message from the server device 101, the SSRC receiving module 712 transmits the notification message to the acknowledgement sending module 714. The acknowledgement sending module 714 is configured to analyze availability of resources at the receiver device 105, for satisfying the request. When the receiver device 105 is associated with sufficient resources to satisfy the request, the acknowledgement sending module 714 sends the acknowledgement to the server device 101. In an embodiment, when the receiver device 105 is not associated with enough resources to satisfy the request, the acknowledgement sending module 714 does not send the acknowledgement to the server device 101. For example, as seen from FIG. 4, at operation 3 the server device 101 receives acceptance which corresponds to the acknowledgement sent by the receiver device 105.

Returning to FIG. 7, upon transmitting the acknowledgement, the acknowledgement sending module 714 provides the control of performing further operations to the media stream receiving module 716. The media stream receiving module 716 is configured to receive the one or more media streams from the server device 101 along with respective SSRC identifiers.

Figure 8:
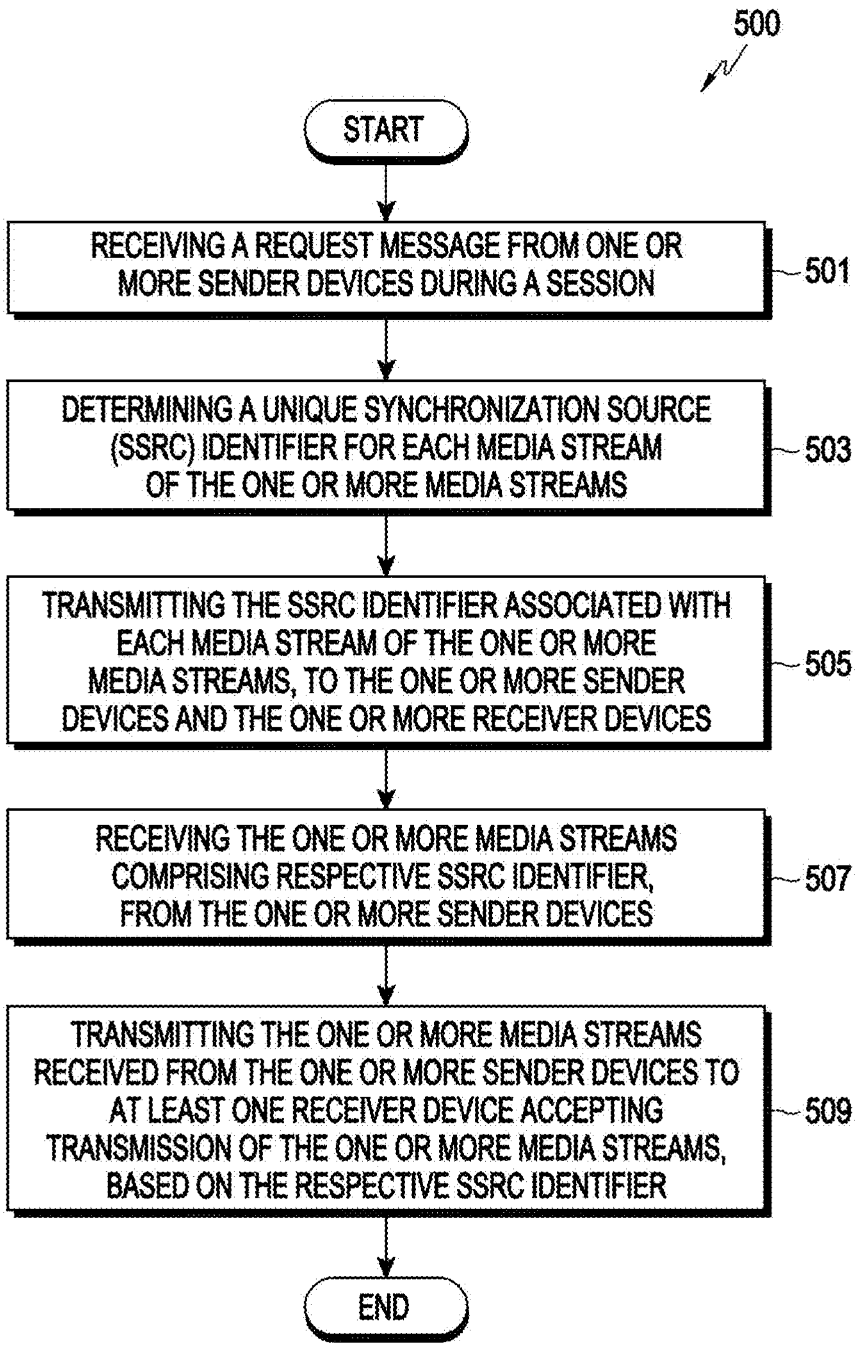
FIG. 8 is a flowchart illustrating a method for a server device for managing Synchronization Source (SSRC) collisions in Mission Critical Services (MCX), according to an embodiment of the disclosure.

FIG. 8 is a flowchart illustrating a method for a server device for managing Synchronization Source (SSRC) collisions in Mission Critical Services (MCX), according to an embodiment of the disclosure.

Referring to FIG. 8, the method 500 comprises one or more blocks illustrating a method of managing Synchronization Source (SSRC) collisions in Mission Critical Services (MCX), according to an embodiment of the disclosure. The method 500 may be described in the general context of computer-executable instructions. Generally, computer-executable instructions can include routines, programs, objects, components, data structures, procedures, modules, and functions, which perform functions or implement abstract data types.

The order in which the method 500 is described is not intended to be construed as a limitation, and any number of the described method blocks can be combined in any order to implement the method 500. Additionally, individual blocks may be deleted from the methods without departing from scope of the subject matter described herein. Furthermore, the method 500 can be implemented in any suitable hardware, software, firmware, or combination thereof.

At block 501, the method 500 may include receiving, by a server device 101, a request message from one or more sender devices during a session. The request message comprises a request to transmit one or more media streams to one or more receiver devices. The one or more media streams comprises Mission Critical Push to Talk (MCPTT) content, Mission Critical Video (MCVD), haptic sensor data, text string data and content associated with audio and video communication services.

At block 503, the method 500 may include determining, by the server device 101, a unique Synchronization Source (SSRC) identifier for each media stream of the one or more media streams. Further, determining whether one or more historic SSRC identifiers from a prestored SSRC identifier list, is associated with the one or more media streams of the session. Followed by assigning one or more historic SSRC identifiers to the one or more media streams, when the one or more historic SSRC identifiers from the prestored SSRC identifier list are not associated with the one or more media streams of the session. And generating the unique SSRC identifier for each media stream of the one or more media streams, when each historic SSRC identifier from the prestored SSRC identifier list is associated with the one or more media streams of the session.

At block 505, the method 500 may include transmitting, by the server device 101, the SSRC identifier associated with each media stream of the one or more media streams, to the one or more sender devices and the one or more receiver devices. Transmitting the SSRC identifier in a grant message indicative of a permission from the server device 101, to transmit the one or more media streams using the SSRC identifier received in the grant message.

At block 507, the method 500 may include receiving, by the server device 101, the one or more media streams comprising respective SSRC identifier, from the one or more sender devices.

At block 509, the method 500 may include transmitting, by the server device 101, the one or more media streams received from the one or more sender devices to at least one receiver device accepting transmission of the one or more media streams, based on the respective SSRC identifier.

Figure 9:
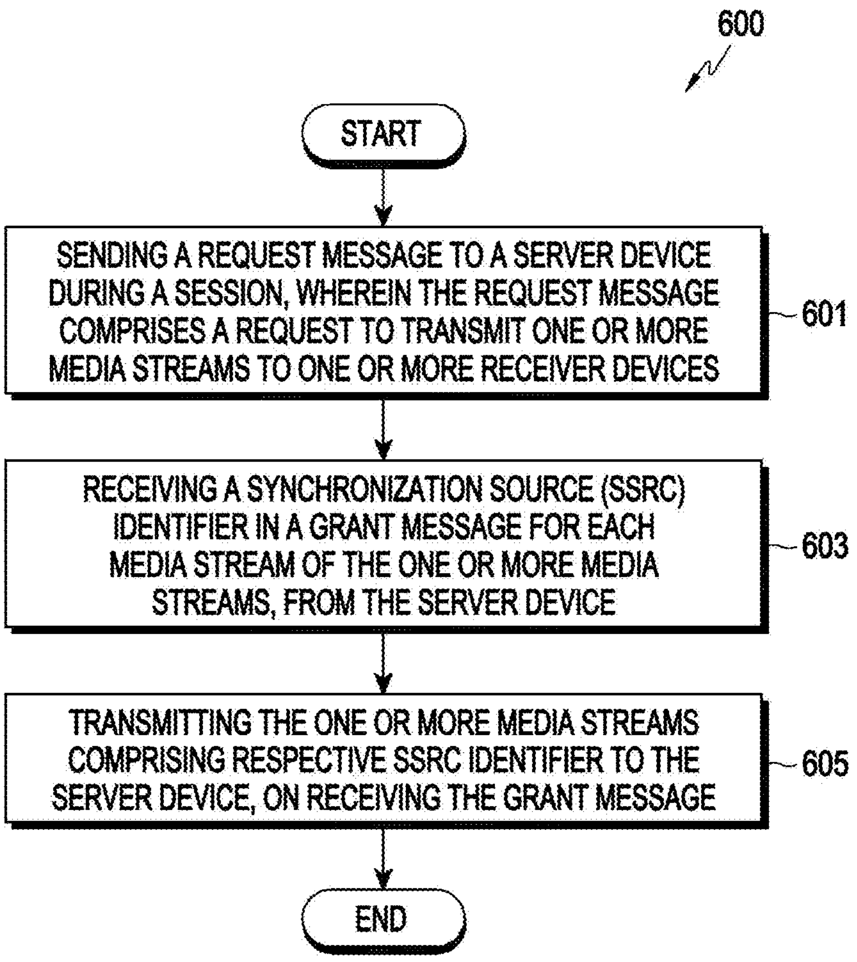
FIG. 9 is a flowchart illustrating a method for a sender device for managing Synchronization Source (SSRC) collisions in Mission Critical Services (MCX), according to an embodiment of the disclosure.

FIG. 9 is a flowchart illustrating a method for a sender device for managing Synchronization Source (SSRC) collisions in Mission Critical Services (MCX), according to an embodiment of the disclosure.

Referring to FIG. 9, the method 600 comprises one or more blocks illustrating a method of managing Synchronization Source (SSRC) collisions in Mission Critical Services (MCX), according to an embodiment of the disclosure. The method 600 may be described in the general context of computer-executable instructions. Generally, computer-executable instructions can include routines, programs, objects, components, data structures, procedures, modules, and functions, which perform functions or implement abstract data types.

The order in which the method 600 is described is not intended to be construed as a limitation, and any number of the described method blocks can be combined in any order to implement the method 600. Additionally, individual blocks may be deleted from the methods without departing from scope of the subject matter described herein. Furthermore, the method 600 can be implemented in any suitable hardware, software, firmware, or combination thereof.

At block 601, the method 600 may include sending, by a sender device 103, a request message to a server device 101 during a session, wherein the request message comprises a request to transmit one or more media streams to one or more receiver devices.

At block 603, the method 600 may include receiving, by the sender device 103, a Synchronization Source (SSRC) identifier in a grant message for each media stream of the one or more media streams, from the server device 101.

At block 605, the method 600 may include transmitting, by the sender device 103, the one or more media streams comprising respective SSRC identifier to the server device 101, on receiving the grant message.

Figure 10:
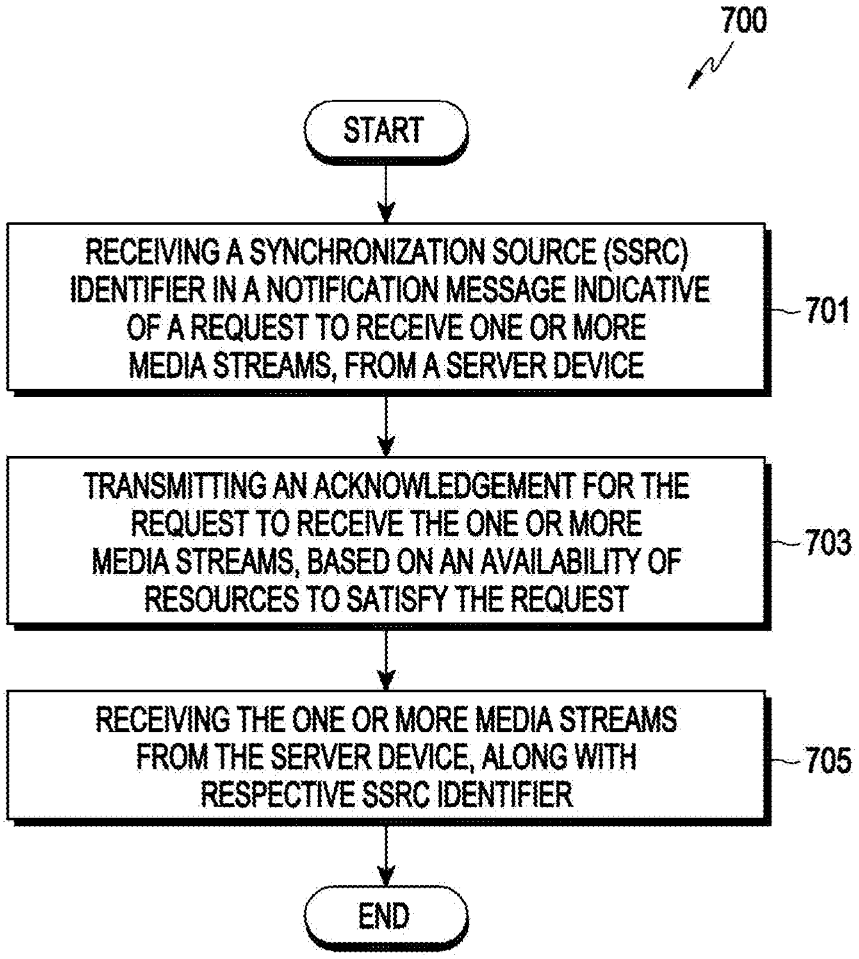
FIG. 10 is a flowchart illustrating a method for a receiver device for managing Synchronization Source (SSRC) collisions in Mission Critical Services (MCX), according to an embodiment of the disclosure.

FIG. 10 is a flowchart illustrating a method for a receiver device for managing Synchronization Source (SSRC) collisions in Mission Critical Services (MCX), according to an embodiment of the disclosure.

Referring to FIG. 10, the method 700 comprises one or more blocks illustrating a method of managing Synchronization Source (SSRC) collisions in Mission Critical Services (MCX), according to an embodiment of the disclosure. The method 700 may be described in the general context of computer-executable instructions. Generally, computer-executable instructions can include routines, programs, objects, components, data structures, procedures, modules, and functions, which perform functions or implement abstract data types.

The order in which the method 700 is described is not intended to be construed as a limitation, and any number of the described method blocks can be combined in any order to implement the method 700. Additionally, individual blocks may be deleted from the methods without departing from scope of the subject matter described herein. Furthermore, the method 700 can be implemented in any suitable hardware, software, firmware, or combination thereof.

At block 701, the method 700 may include receiving, by a receiver device 105, a Synchronization Source (SSRC) identifier in a notification message indicative of a request to receive one or more media streams, from a server device 101.

At block 703, the method 700 may include transmitting, by the receiver device 105, an acknowledgement for the request to receive the one or more media streams, based on availability of resources to satisfy the request.

At block 705, the method 700 may include receiving, by the receiver device 105, the one or more media streams from the server device 101, along with respective SSRC identifier.

Figure 11:
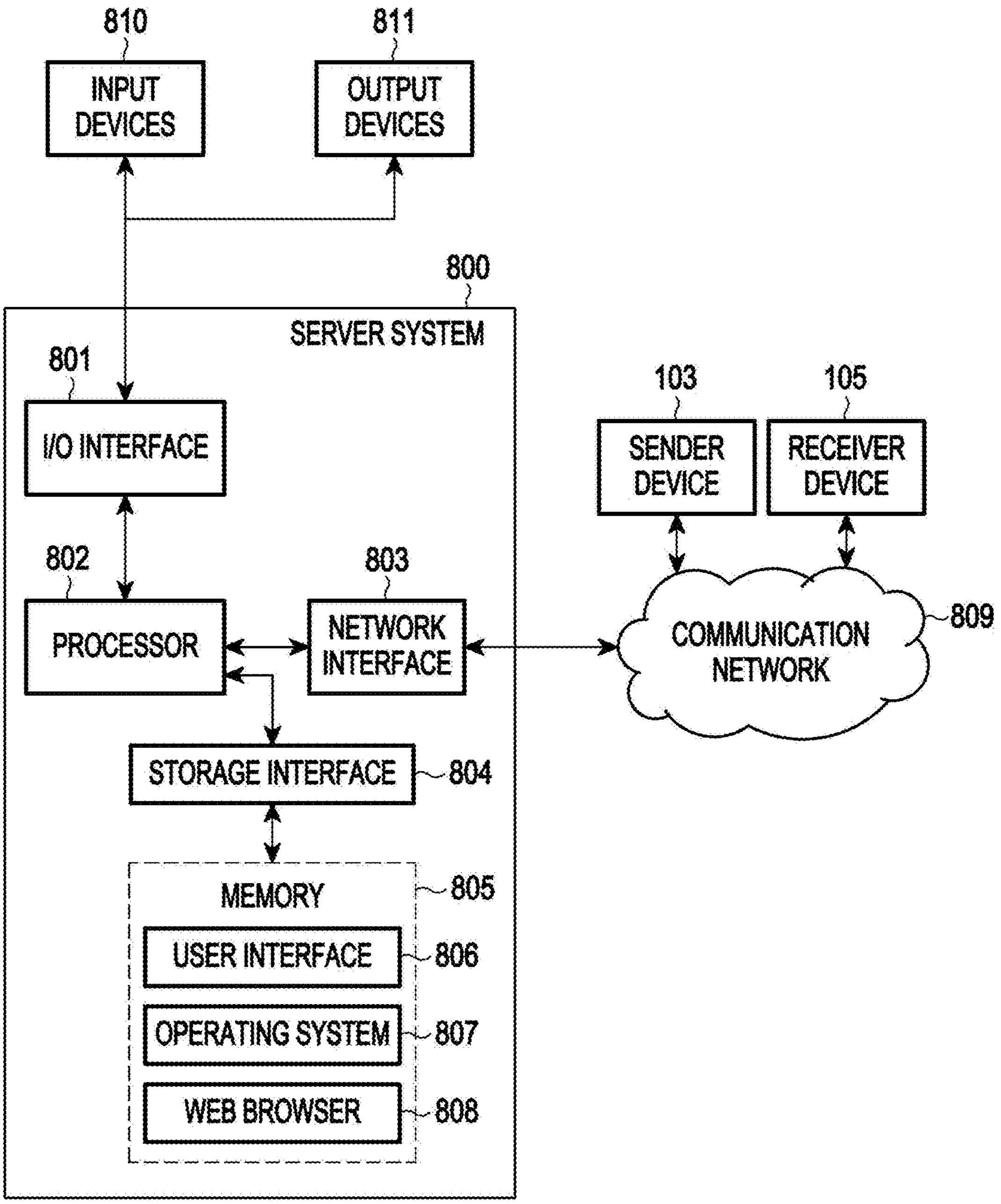
FIG. 11 is a block diagram of a system for implementing consistency according to an embodiment of the disclosure.

FIG. 11 is a block diagram of a computer system for implementing consistency according to an embodiment of the disclosure.

FIG. 11 illustrates a block diagram of a computer system 800 for implementing embodiments consistent with the disclosure. In some embodiments, the computer system 800 can be a server device 101 that comprises a processor (also referred as a processor 802 in this FIG. 11) that is used for managing Synchronization Source (SSRC) collisions in Mission Critical Services (MCX). The processor 802 may include at least one data processor for executing program components for executing user or system-generated business processes. The processor 802 may include specialized processing units such as integrated system (bus) controllers, memory management control units, floating point units, graphics processing units, digital signal processing units, etc.

The processor 802 may be disposed in communication with input devices 810 and output devices 811 via I/O interface 801. The I/O interface 801 may employ communication protocols/methods such as, without limitation, audio, analog, digital, stereo, Institute of Electrical and Electronics Engineers (IEEE)-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), worldwide interoperability for microwave access (WiMax), or the like), etc.

Using the I/O interface 801, computer system 800 may communicate with input devices 810 and output devices 811.

In some embodiments, the processor 802 may be disposed in communication with a communication network 809 via a network interface 803. The network interface 803 may communicate with the communication network 809. The network interface 803 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 803 and the communication network 809, the computer system 800 may communicate with the sender device 103 and the receiver device 105.

The communication network 809 can be implemented as one of the different types of networks, such as intranet or Local Area Network (LAN) and such within the organization. The communication network 809 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

Further, the communication network 809 may include a variety of network devices, including routers, bridges, servers, computing devices, storage devices, etc. In some embodiments, the processor 802 may be disposed in communication with memory 805 (e.g., random access memory (RAM), read only memory (ROM), etc. not shown in FIG. 11) via a storage interface 804. The storage interface 804 may connect to memory 805 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 805 may store a collection of program or database components, including, without limitation, a user interface 806, an operating system 807, a web browser 808 etc. In some embodiments, the computer system 800 may store user/application data, such as the data, variables, records, etc. as described in this disclosure. Such databases may be implemented as fault-tolerant, relational, scalable, secure databases such as Oracle or Sybase.

Operating system 807 may facilitate resource management and operation of computer system 800. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU® KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. User interface 806 may facilitate display, execution, interaction, manipulation, or operation of program components through textual or graphical facilities. For example, user interfaces may provide computer interaction interface elements on a display system operatively connected to computer system 800, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

The computer system 800 may implement web browser 808 stored program components. Web browser 808 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX, DHTML, ADOBE® FLASH®, JAVASCRIPT®, JAVA®, Application Programming Interfaces (APIs), etc. The computer system 800 may implement a mail server stored program component. The mail server may be an Internet mail server such as Microsoft Exchange, or the like. The mail server may utilize facilities such as ASP, ACTIVEX®, ANSI® C++/C #, MICROSOFT®, NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 800 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term “computer-readable medium” should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

An embodiment of the disclosure provides generation of a unique SSRC identifier by a server device, rather than a sender device. The generated SSRC identifier is transmitted to the sender device who wishes to share a media stream with one or more receiver devices. The sender device may transmit the media stream with the SSRC identifier generated by the server device for the corresponding media stream. The server device maintains a record of the SSRC identifiers generated for a session, due to which the SSRC collisions are avoided as generation of each SSRC identifier remains unique. As unique SSRC identifiers are generated for transmission of each media stream, crypto will be stronger and will be less prone to any kind of hacking.

EQUIVALENTS

A description of an embodiment with several components in communication with each other does not imply that all such components are required. On the contrary a variety of optional components are described to illustrate the wide variety of possible embodiments of the disclosure. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The specification has described a system and a method for providing access to content associated with content providers. The illustrated steps are set out to explain the embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words “comprising,” “having,” “containing,” and “including,” and other similar forms are intended to be equivalent in meaning and be open-ended in that an item or items following any one of these words is not meant to be an exhaustive listing of such item or items or meant to be limited to only the listed item or items.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of managing, performed by a server device, synchronization source (SSRC) collisions in mission critical services (MCX), the method comprising:

receiving a request message for requesting to transmit two or more media streams to one or more receiver devices, from a sender device during a session;

determining a unique SSRC identifier for each media stream of the two or more media streams; and before receiving the two or more media streams from the sender device based on the request message, transmitting the unique SSRC identifier for each media stream of the two or more media streams to the sender device and the one or more receiver devices.

2. The method of claim 1, further comprising:

receiving the two or more media streams comprising their respective unique SSRC identifier from the sender device; and transmitting the received two or more media streams comprising their respective unique SSRC identifier to at least one receiver device accepting transmission of the two or more media streams.

3. The method of claim 1, wherein the two or more media streams comprise at least one of mission critical push to talk (MCPTT) content, mission critical video (MCVD), haptic sensor data, text string data, or content associated with audio and video communication services.

4. The method of claim 1, wherein the determining of the unique SSRC identifier for each media stream of the two or more media streams comprises:

determining whether any historic SSRC identifier from a prestored SSRC identifier list, is associated with any of the two or more media streams of the session; and determining the unique SSRC identifier for each media stream of the two or more media streams based on:

assigning one or more historic SSRC identifiers to the two or more media streams, when the one or more historic SSRC identifiers from the prestored SSRC identifier list are not associated with the two or more media streams of the session, or generating the unique SSRC identifier for each media stream of the two or more media streams, when each historic SSRC identifier from the prestored SSRC identifier list is associated with the two or more media streams of the session.

5. The method of claim 4, wherein the generating of the unique SSRC identifier for each media stream of the two or more media streams further comprises:

determining whether the generated SSRC identifier is included in the prestored SSRC identifier list; and in case that the generated SSRC identifier is included in the prestored SSRC identifier list, regenerating the SSRC identifier until the SSRC identifier does not appear in the prestored SSRC identifier list.

6. The method of claim 1, wherein the transmitting of the unique SSRC identifier for each media stream of the two or more media streams to the sender device comprises:

transmitting the unique SSRC identifier for each media stream of the two or more media streams in a grant message indicating a permission from the server device to transmit the two or more media streams using the unique SSRC identifier for each media stream of the two or more media streams received in the grant message.

7. The method of claim 1, wherein the transmitting of the unique SSRC identifier for each media stream of the two or more media streams to the one or more receiver devices comprises:

transmitting the unique SSRC identifier for each media stream of the two or more media streams in a notification message indicating a request to receive the two or more media streams;

waiting for a predefined time period to receive an acknowledgment for the notification message, from at least one receiver device of the one or more receiver devices; and transmitting the two or more media streams to the at least one receiver device of the one or more receiver devices, when the acknowledgment is received within the predefined time period.

8. A server device for managing synchronization source (SSRC) collisions in mission critical services (MCX), the server device comprising:

memory storing instructions; and one or more processors communicatively coupled to the memory, wherein the instructions, when executed by the one or more processors individually or collectively, cause the server device to:

receive a request message for requesting to transmit two or more media streams to one or more receiver devices, from a sender device during a session, determine a unique SSRC identifier for each media stream of the two or more media streams, and before receiving the two or more media streams from the sender device based on the request message, transmit the unique SSRC identifier for each media stream of the two or more media streams to the sender device and the one or more receiver devices.

9. The server device of claim 8, wherein the instructions, when executed by the one or more processors individually or collectively, further cause the server device to:

receive the two or more media streams comprising their respective unique SSRC identifier from the sender device, and transmit the received two or more media streams comprising their respective unique SSRC identifier to at least one receiver device accepting transmission of the two or more media streams.

10. The server device of claim 8, wherein the two or more media streams comprise at least one of mission critical push to talk (MCPTT) content, mission critical video (MCVD), haptic sensor data, text string data, or content associated with voice and video communication services.

11. The server device of claim 8, wherein, to determine the unique SSRC identifier for each media stream of the two or more media streams, the instructions, when executed by the one or more processors individually or collectively, further cause the server device to:

determine whether any historic SSRC identifier from a prestored SSRC identifier list, is associated with any of the two or more media streams of the session, and determine the unique SSRC identifier for each media stream of the two or more media streams based on:

assigning one or more historic SSRC identifiers to the two or more media streams, when the one or more historic SSRC identifiers from the prestored SSRC identifier list are not associated with the two or more media streams of the session, or generating, the unique SSRC identifier for each media stream of the two or more media streams, when each historic SSRC identifier from the prestored SSRC identifier list is associated with the two or more media streams of the session.

12. The server device of claim 11, wherein, to generate the unique SSRC identifier for each media stream of the two or more media streams, the instructions, when executed by the one or more processors individually or collectively, further cause the server device to:

determine whether the generated SSRC identifier is included in the prestored SSRC identifier list, and in case that the generated SSRC identifier is included in the prestored SSRC identifier list, regenerate the SSRC identifier until the SSRC identifier does not appear in the prestored SSRC identifier list.

13. The server device of claim 8, wherein, to transmit the unique SSRC identifier for each media stream of the two or more media streams to the sender device, the instructions, when executed by the one or more processors individually or collectively, further cause the server device to:

transmit the unique SSRC identifier for each media stream of the two or more media streams in a grant message indicating a permission from the server device to transmit the two or more media streams using the unique SSRC identifier for each media stream of the two or more media streams received in the grant message.

14. The server device of claim 8, wherein, to transmit the unique SSRC identifier for each media stream of the two or more media streams to the one or more receiver devices, the instructions, when executed by the one or more processors individually or collectively, further cause the server device to:

transmit the unique SSRC identifier associated with for each media stream of the two or more media streams in a notification message indicating a request to receive the two or more media streams, wait for a predefined time period to receive an acknowledgment for the notification message, from at least one receiver device of the one or more receiver devices, and transmit the two or more media streams to the at least one receiver device of the one or more receiver devices, when the acknowledgment is received within the predefined time period.

15. One or more non-transitory computer-readable storage media storing instructions that, when executed by one or more processors of a server device individually or collectively, cause the server device to perform operations for managing synchronization source (SSRC) collisions in mission critical services (MCX), the operations comprising:

receiving a request message for requesting to transmit two or more media streams to one or more receiver devices, from a sender device during a session;

determining a unique SSRC identifier for each media stream of the two or more media streams; and before receiving the two or more media streams from the sender device based on the request message, transmitting the unique SSRC identifier for each media stream of the two or more media streams to the sender device and the one or more receiver devices.

16. The one or more non-transitory computer-readable storage media of claim 15, wherein the operations further comprise:

receiving the two or more media streams comprising their respective unique SSRC identifier from the sender device; and transmitting the received two or more media streams comprising their respective unique SSRC identifier to at least one receiver device accepting transmission of the two or more media streams.

17. The one or more non-transitory computer-readable storage media of claim 15, wherein the determining of the unique SSRC identifier for each media stream of the two or more media streams comprises:

determining whether any historic SSRC identifier from a prestored SSRC identifier list, is associated with any of the two or more media streams of the session; and determining the unique SSRC identifier for each media stream of the two or more media streams based on:

assigning one or more historic SSRC identifiers to the two or more media streams, when the one or more historic SSRC identifiers from the prestored SSRC identifier list are not associated with the two or more media streams of the session, or generating the unique SSRC identifier for each media stream of the two or more media streams, when each historic SSRC identifier from the prestored SSRC identifier list is associated with the two or more media streams of the session.

18. The one or more non-transitory computer-readable storage media of claim 17, wherein the generating of the unique SSRC identifier for each media stream of the two or more media streams further comprises:

determining whether the generated SSRC identifier is included in the prestored SSRC identifier list; and in case that the generated SSRC identifier is included in the prestored SSRC identifier list, regenerating the SSRC identifier until the SSRC identifier does not appear in the prestored SSRC identifier list.

19. The one or more non-transitory computer-readable storage media of claim 15, wherein the transmitting of the unique SSRC identifier for each media stream of the two or more media streams to the sender device comprises:

transmitting the unique SSRC identifier for each media stream of the two or more media streams in a grant message indicating a permission from the server device to transmit the two or more media streams using the unique SSRC identifier for each media stream of the two or more media streams received in the grant message.

20. The one or more non-transitory computer-readable storage media of claim 15, wherein the transmitting of the unique SSRC identifier associated with each media stream of the two or more media streams to the one or more receiver devices comprises:

transmitting the unique SSRC identifier for each media stream of the two or more media streams in a notification message indicating a request to receive the two or more media streams;

waiting for a predefined time period to receive an acknowledgment for the notification message, from at least one receiver device of the one or more receiver devices; and transmitting the two or more media streams to the at least one receiver device of the one or more receiver devices, when the acknowledgment is received within the predefined time period.

* * * * *